US00RE35562E

United States Patent [19]

Hirono et al.

[11] E Patent Number: Re. 35,562

[45] Reissued Date of Patent: Jul. 15, 1997

[54] TAPE PRINTER HAVING SPACING FUNCTION

[75] Inventors: Kazuhisa Hirono, Nagoya; Yasuyo Ooshio; Takashi Ito, both of Nogoya, all of Japan

[73] Assignee: Brother Kogyo Kabushiki Kaisha, Nagoya, Japan

[21] Appl. No.: 506,648

[22] Filed: Jul. 25, 1995

Related U.S. Patent Documents

Reissue of:

[64] Patent No.: 5,230,572
Issued: Jul. 27, 1993
Appl. No.: 831,996
Filed: Feb. 6, 1992

[30] Foreign Application Priority Data

Mar. 28, 1991 [JP] Japan ..... 3-91491

[51] Int. Cl.[6] ..... B41J 19/14

[52] U.S. Cl. ..... 400/3; 400/9; 400/10; 400/76

[58] Field of Search ..... 400/1, 3, 9, 12, 400/61, 62, 63, 64, 70, 74, 76, 581, 615.2, 10

[56] References Cited

U.S. PATENT DOCUMENTS 4,121,228 10/1978 Cowe et al. .
4,225,249 9/1980 Kettler et al. .
4,348,738 9/1982 Grier et al. .
4,484,826 11/1984 Horn et al. .
4,927,278 5/1990 Kuzuya et al. .
5,069,557 12/1991 Kuzuya et al. .
5,188,469 2/1993 Nagao et al. .
5,348,406 9/1994 Yoshiaki et al. .

FOREIGN PATENT DOCUMENTS 0364305 4/1990 European Pat. Off. .
1-152070 6/1989 Japan .
2-62265 3/1990 Japan .
2-106555 4/1990 Japan .

*Primary Examiner*—John S. Hilten
*Attorney, Agent, or Firm*—Oliff & Berridge

[57] ABSTRACT

A tape printer automatically expands an input character string up to the length of a desired printing range. Operating a fixed length key after input of printing data causes an indication, for example, "PRINTING LENGTH: 10" to appear. The "PRINTING LENGTH" indication is varied by, for example, rotating a character selecting dial. When a printing key is operated, an actually printable dot column count is determined from the selected printing length. The dot column count minus the total character width (dot column count required to print all desired characters) provides a margin space YS. If the margin space is equal to or greater than the total character spacing (i.e., the number of inter-character positions), a new margin space YS is determined, and the character spacing value is incremented by one dot column. The characters are then printed on the printing tape using the spacing value thus obtained.

54 Claims, 33 Drawing Sheets

FIG. 5B

| ITEM | INSTRUCTION |
|---|---|
| S1 | INITIALIZE |
| S2 | KEY INPUT? |
| S3 | SETTING KEY OPERATED? |
| S4 | DOUBLE-LINE PRINTING KEY OPERATED? |
| S5 | DISPLAY FIRST SELECTED SETTING FOR DOUBLE-LINE PRINTING |
| S6 | F1 ← 1 |
| S7 | SINGLE-LINE PRINTING KEY OPERATED? |
| S8 | DISPLAY SINGLE-LINE PRINTING MARK > AND STORE SINGLE-LINE PRINTING COMMAND DATA |
| S9 | F1 ← 0 |

FIG. 7B

| ITEM | INSTRUCTION |
|---|---|
| S16 | CHANGE IN ENS? |
| S17 | F1 = 1? |
| S18 | DISPLAY NEXT SELECTED SETTING FOR DOUBLE-LINE PRINTING |
| S19 | UPPER PRINTING LINE? |
| S20 | F2 ← 1 |
| S21 | F2 ← 0 |
| S22 | F3 = 1? |
| S23 | DISPLAY NEXT SELECTED SETTING FOR PRINTING BASE LINE POSITION CHANGE |
| S24 | BASE LINE POSITION CHANGED? |
| S25 | F4 ← 1 |
| S26 | F4 ← 0 |
| S27 | F5 = 1? |
| S28 | DISPLAY NEXT SELECTED SETTING FOR PRINTING BASE LINE POSITION |

FIG. 9B

| ITEM | INSTRUCTION |
|---|---|
| S34 | F1 = 1? |
| S35 | F2 = 1? |
| S36 | DISPLAY UPPER PRINTING LINE MARK △ |
| S37 | DISPLAY LOWER PRINTING LINE MARK ▽ |
| S38 | F1 ← 0 |
| S39 | DISPLAY SELECTED SETTING FOR PRINTING BASE LINE POSITION CHANGE |
| S40 | F3 ← 1 |
| S41 | F3 = 1? |
| S42 | F3 ← 0 |
| S43 | F4 = 1? |
| S44 | DISPLAY FIRST SELECTED SETTING FOR PRINTING BASE LINE POSITION |
| S45 | F5 ← 1 |

FIG. 10B

| ITEM | INSTRUCTION |
|---|---|
| S46 | F5 = 1? |
| S47 | INCLUDE PRINTING BASE LINE POSITION CHANGE AMOUNT DATA INTO PRINTING COMMAND DATA |
| S48 | F5 ← 0 |
| S49 | F6 = 1? |
| S50 | STORE PRINTING LENGTH INTO MEMORY |
| S51 | ANOTHER FLAG SET? |
| S52 | ESTABLISH SETTING CORRESPONDING TO FLAG |
| S53 | STORE CODE DATA INTO DATA BUFFER |

FIG. 11B

| ITEM | INSTRUCTION |
|---|---|
| S60 | INITIALIZE |
| S61 | PERFORM ARRANGEMENT PROCESS |
| S62 | F6 = 1? |
| S63 | PERFORM CHARACTER SPACING DETERMINING PROCESS |
| S64 | EF = 1? |
| S65 | F6 ← 0 ; EF ← 0 |
| S66 | SET FIRST ADDRESS IN FIRST ARRANGEMENT MEMORY TO FIRST POINTER |
| S67 | READ DATA |
| S68 | END OF DATA? |

FIG. 12B

| ITEM | INSTRUCTION |
|---|---|
| S69 | CODE DATA? |
| S70 | ">" CODE? |
| S71 | F1 ← 0 |
| S72 | F1 ← 1 |
| S73 | SET PW |
| S74 | INCREMENT FIRST POINTER |
| S75 | F6 = 1? |
| S76 | PERFORM REMAINDER SPACING PROCESS CONTROL |
| S77 | SET CHARACTER SPACING VALUE CORRESPONDING TO CHARACTER SIZE |
| S78 | F1 = 1? |
| S79 | STORE DOT PATTERN DATA INTO PRINTING BUFFER |
| S80 | PERFORM DATA STORING PROCESS |
| S81 | PERFORM CHARACTER PRINTING PROCESS |

FIG. 13B

| ITEM | INSTRUCTION |
|---|---|
| S90 | STORE CODE DATA FROM INPUT DATA BUFFER INTO FIRST ARRANGEMENT MEMORY |
| S91 | SET FIRST ADDRESS IN FIRST ARRANGEMENT MEMORY TO FIRST POINTER |
| S92 | READ CODE DATA OF FIRST POINTER |
| S93 | "▵" DATA? |
| S94 | SEARCH THROUGH FIRST ARRANGEMENT MEMORY |
| S95 | "▿" DATA? |
| S96 | SET "▿" DATA AND SUBSEQUENT CONTIGUOUS CODE DATA TO CORRESPONDING ADDRESSES IN SECOND ARRANGEMENT MEMORY |
| S97 | STORE SPACE INTO SECOND ARRANGEMENT MEMORY |
| S98 | UDN > LDN? |
| S99 | STORE SPACE INTO SECOND ARRANGEMENT MEMORY |
| S100 | UDN = LDN? |
| S101 | STORE SPACE INTO FIRST ARRANGEMENT MEMORY |
| S102 | ARRANGE CONTENTS OF FIRST ARRANGEMENT MEMORY |
| S103 | END OF DATA? |
| S104 | ASSIGN NEXT SEARCH START ADDRESS TO FIRST POINTER |
| S105 | "▿" DATA? |
| S106 | SET CODE DATA ON LOWER PRINTING LINE TO CORRESPONDING ADDRESSES IN SECOND ARRANGEMENT MEMORY |
| S107 | CONVERT TO SPACES "▿" DATA AND SUBSEQUENT CONTIGUOUS DATA IN FIRST ARRANGEMENT MEMORY |

FIG. 17B

| ITEM | INSTRUCTION |
|---|---|
| S150 | SET ADDRESS TO SECOND POINTER |
| S151 | READ CODE DATA POINTED TO BY FIRST POINTER |
| S152 | STORE DOT PATTERN DATA INTO PRINTING BUFFER |
| S153 | BASE LINE POSITION CHANGE? |
| S154 | READ BASE LINE POSITION CHANGE AMOUNT "d" |
| S155 | $d \leftarrow 0$ |
| S156 | SHIFT DOT PATTERN DATA BY (4+d) DOTS |
| S157 | READ CODE DATA POINTED TO BY SECOND POINTER |
| S158 | STORE DOT PATTERN DATA IN PRINTING BUFFER |
| S159 | BASE LINE POSITION CHANGE? |
| S160 | READ BASE LINE POSITION CHANGE AMOUNT "d" |
| S161 | $d \leftarrow 0$ |
| S162 | SHIFT DOT PATTERN DATA BY (4+d) DOTS |

FIG. 29B

| ITEM | INSTRUCTION |
|---|---|
| S110 | MN ← 0 ; SA ← 0 ; MW ← 0 |
| S111 | ASSIGN FIRST ADDRESS IN FIRST ARRANGEMENT MEMORY TO FIRST POINTER |
| S112 | READ DATA |
| S113 | END OF DATA? |
| S114 | CODE DATA? |
| S115 | SELECT PITCH TABLE |
| S170 | SET CHARACTER WIDTH TO PW ACCORDING TO PITCH TABLE |
| S116 | MN ← (MN + 1) |
| S117 | MW ← (MW + PW) |
| S118 | INCREMENT FIRST POINTER |

TAPE PRINTER HAVING SPACING FUNCTION

Matter enclosed in heavy brackets [ ] appears in the original patent but forms no part of this reissue specification; matter printed in italics indicates the additions made by reissue.

CROSS REFERENCE TO RELATED PATENT AND APPLICATION

U.S. Pat. No. 4,927,278 is expressly incorporated by reference in its [entirely] *entirety* herein. This application is also related to U.S. patent application Ser. No. 07/831,971, (*which issued as U.S. Pat. No. 5,302,038*) entitled "TAPE PRINTING DEVICE FOR PRINTING A PLURALITY OF PRINTING LINES DIRECTLY ADJACENT TO EACH OTHER ACROSS THE WIDTH OF A TAPE", filed concurrently herewith, the disclosure of which is incorporated herein by reference.

BACKGROUND OF THE INVENTION

1. Field of the Invention

The present invention relates to a tape printer, and more particularly, to a tape printer that evenly spaces a plurality of input characters and prints the evenly spaced characters within the length of a predetermined printing range.

2. Description of Related Art

Heretofore, a number of proposals have been made regarding improvements in small-size tape printers that print desired character strings along a printing tape about 10 mm wide. A tape printer proposed by the applicant of the present application, and disclosed in Japanese Laid-Open Patent No. 1-152070, is capable of printing full size and double size characters, and of selectively printing full size characters either in center printing mode or in lower-side printing mode. In center printing mode, the tape printer prints full size characters at the center of the tape (across its width); in lower-side printing mode, the tape printer prints the characters on the lower-side of the tape (across its width).

The dot pattern of characters printed by tape printers is generally 24 dots (high) by 24 dots (across) for full size characters, or 48 dots (high) by 48 dot (across) for double size characters. Dot pattern data are stored beforehand in a nonvolatile memory (e.g., ROM). The size of characters to be printed is selected from among a plurality of character size options. Once a character size is selected, the corresponding character spacing (i.e., the amount of spacing between adjacent characters) is automatically determined to have some predefined value.

In many instances, for example, the tape printer is used to print a title or information regarding the contents of a given file onto a printing tape, the printed tape being adhered (pasted) onto an appropriate position of a casing of the file. In such instances, it is often desired to expand the character string representing the file title or contents up to the entire length of the pasting position, the characters remaining evenly spaced when printed within that length.

However, as mentioned above, in existing tape printers, the spacing between characters to be printed is predefined depending on the selected character size. That is, the characters may not be spaced evenly for printing over a given length.

One conventional solution to the above problem is to insert one or more spaces after each character as they are input by an operator. One disadvantage of this solution is that the printed character string is simply extended by the number of added spaces; it is still difficult to equalize the printing position of the character string with the length of the pasting range. It is also difficult for an operator to insert spaces which will result in all characters being equally spaced within a given label length.

SUMMARY OF THE INVENTION

It is therefore an object of the present invention to provide a tape printer capable of automatically expanding an input character string up to the entire length of a desired printing range, with the characters being evenly spaced when printed within that length.

To achieve the foregoing and other objects, and to overcome the shortcomings discussed above, according to one aspect of the present invention, there is provided a tape printer for printing characters onto a print medium tape in accordance with input data, the tape printer comprising: input means for inputting the code data for characters (character data) and various command signals (command data); an input data buffer for storing the input code data; a printing head for printing characters onto the print medium tape; driving means for driving the printing head by successively receiving the code data from the input data buffer; printing length setting means for setting the length of a printing range for printing onto the print medium tape; character spacing determining means for receiving the code data from the input data buffer and the printing range length data set by the printing length setting means in order to determine a character spacing value so that input characters are evenly spared when printed within the printing range; and spacing controlling means for receiving a character spacing value output from the character spacing determining means, and controlling the driving means in order to provide the designated character spacing value between characters when the characters are printed.

In a preferred structure according to the invention, the printing length setting means sets the length of the range for printing onto the print medium tape. When the code data received from the input means are stored into the input data buffer, the character spacing determining means receives both the code data from the input data buffer and the output from the printing length setting means to determine the character spacing value so that the input characters are equally spared when printed within the established printing range. The space controlling means receives the output of the character spacing determining means and instructs the driving means accordingly to space the characters during printing. As a result, the driving means drives the printing head to print characters while successfully receiving dot string data of a dot pattern from a printing buffer, with the printed characters being equally spaced as designated by the spare controlling means. Thus the input characters are equally spared automatically over the entire length of the printing range.

With this invention, the printing length setting means, character spacing determining means and spare controlling means combine to provide an optimum spacing of input characters to be printed over the entire length of an established printing range, the characters being equally spaced automatically when printed over the length of the desired printing range.

Further objects, features and advantages of the invention will become more apparent upon reading the following description and appended drawings.

BRIEF DESCRIPTION OF THE DRAWINGS

The invention will be described in detail with reference to the following drawings in which like reference numerals refer to like elements, and wherein:

FIGS. 5A and 5B are a partial flowchart and table outlining a tape printing control routine for use with the first embodiment of the present invention;

FIGS. 7A and 7B are another partial flowchart and table outlining the tape printing control routine of the present invention;

FIGS. 9A and 9B are another partial flowchart and table outlining the tape printing control routine of the present invention;

FIGS. 10A and 10B are another partial flowchart and table outlining the tape printing control routine of the present invention;

FIGS. 11A and 11B are a partial flowchart and table outlining a printing process control routine for use with the tape printing control routine of the present invention;

FIGS. 12A and 12B are another partial flowchart and table outlining the printing process control routine of the present invention;

FIGS. 13A and 13B are a flowchart and table outlining an arranging process control routine for use with the printing process control routine of the present invention;

FIGS. 17A and 17B are a flowchart and table outlining a data revising process control routine for use with the printing process control routine of the present invention;

FIGS. 29A and 29B are a partial flowchart and table outlining a character spacing determining process control routine in connection with a second embodiment of the invention.

DETAILED DESCRIPTION OF THE PREFERRED EMBODIMENTS

Preferred embodiments of the invention will now be described with reference to the accompanying drawings. The first embodiment utilizes a tape printer capable of printing numerous kanji characters, hiragana characters, katakana characters and alphabetic characters onto a printing tape (also referred to as a print medium tape).

Figure 1:
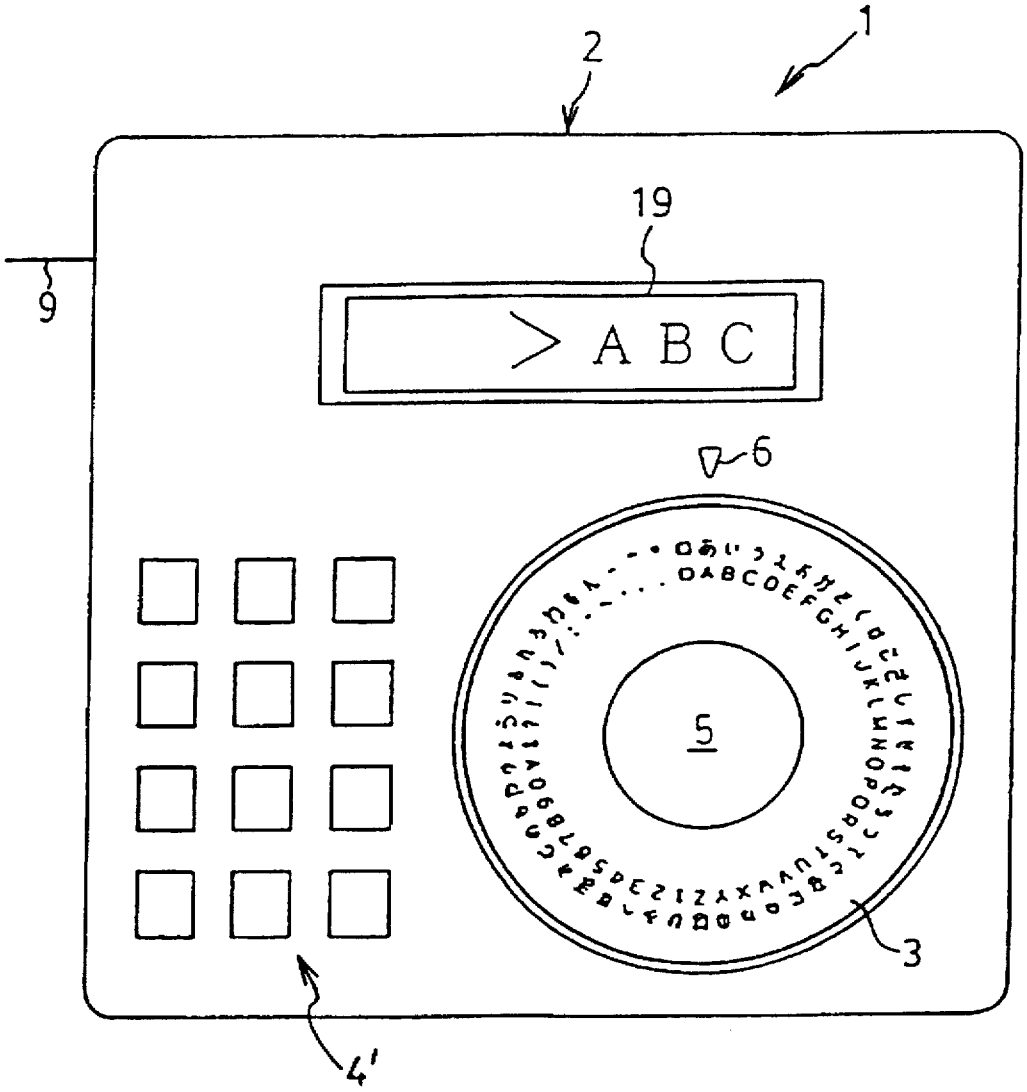
FIG. 1 is a plan view of a tape printer in which a first embodiment of the present invention can be practiced.

As shown in FIG. 1, at the front end of a body frame 2 of the tape printer 1 is a rotatably positioned round-shaped character selecting dial 3 for selecting characters (including symbols). Also positioned at the front end of the body frame 2 is a keyboard 4'. Behind the character selecting dial 3 is an LCD (liquid crystal display) 19 capable of displaying, for example, up to six characters. At the center of the character selecting dial 3 is a setting key 5 for setting (entering) the characters selected by rotation of the character selecting dial 3, or for establishing (entering) printing-related settings. Furthermore, a printing mechanism PM (see FIG. 2) is incorporated within the body frame 2 at the rear of the character selecting dial 3.

The character selecting dial 3 has, for example, 50 stop positions per revolution. Inscribed on top of the dial 3 are the images of the selectable characters in two concentric circles, two characters corresponding to each of the 50 stop positions. Reference numeral 6 indicates a character selecting position mark.

The keyboard 4' comprises a character type changeover key for alternately selecting the hiragana, katakana or alphabetic character type; a converting key (for converting hiragana characters to kanji characters); a non-converting key; a double line printing key for causing characters to be printed in two lines; a single-line printing key for causing characters to be printed in one line; a length setting key for designating the printing of equally spaced input characters over the length of a desired printing range; a printing key for executing printing; a font selecting key for selecting a desired character font; a tape feed key for feeding the printing tape P, and a power switch for turning the power ON and OFF.

Figure 2:
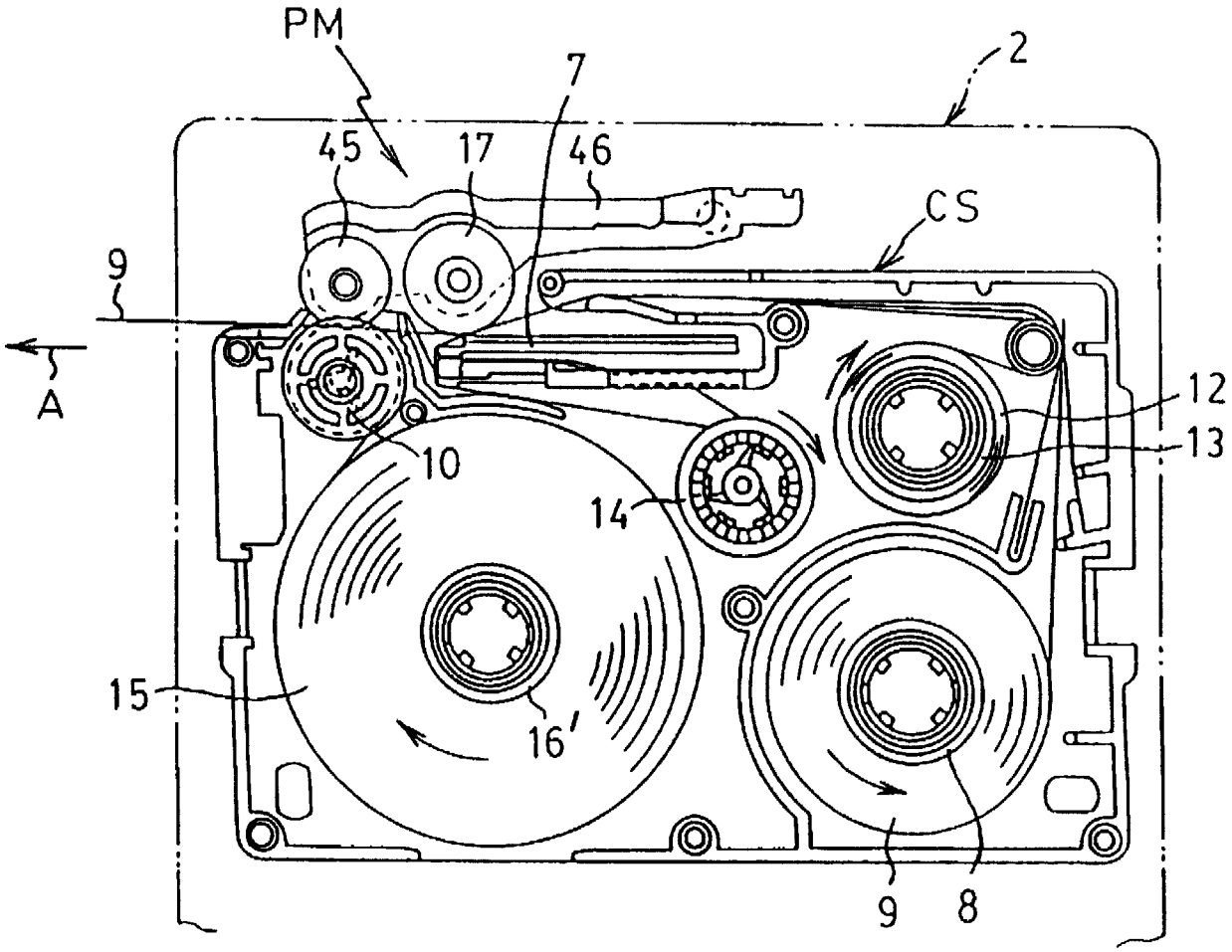
FIG. 2 is a schematic plan view of a printing mechanism in the FIG. 1 tape printer.

Referring to FIG. 2, the printing mechanism PM will now be briefly described. A rectangular tape cassette CS contains a tape spool 8 around which the printing tape 9, made of a transparent film, is wound; a ribbon feed spool 13 around which an ink ribbon 12 is wound; a take-up spool 14 for taking up (receiving) the used ink ribbon 12; a feed spool 16' around which a double-side adhesive tape 15 having the same width as the printing tape 9 is wound having its releasable sheet facing outwardly; and a bonding roller 10 for bonding the printing tape 9 and the double-sided adhesive tape 15 together, the roller 10 and spools 8, 13, 16' all being rotatably furnished in cassette CS.

Figure 4:
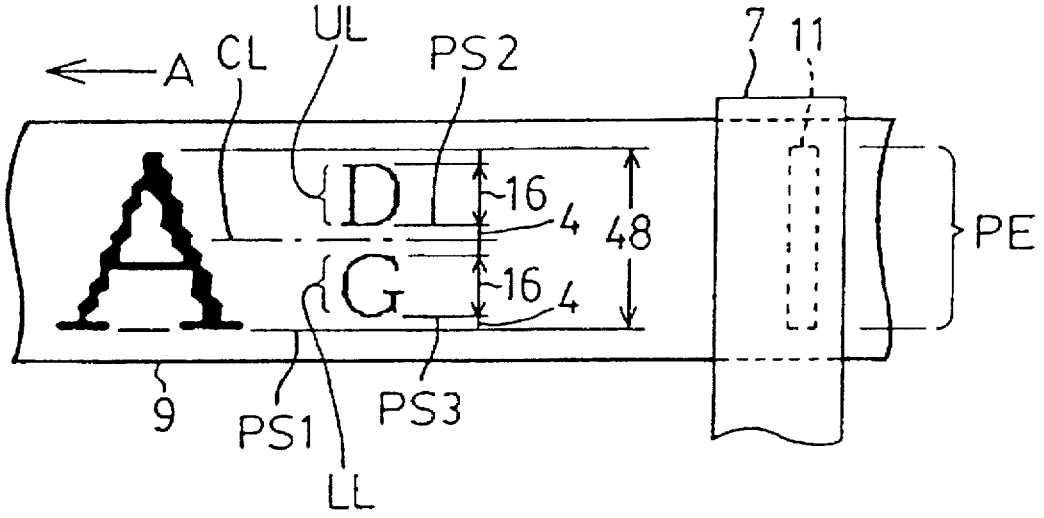
FIG. 4 is a partial front view of the printing mechanism having a thermal head with a printing tape positioned adjacent thereto.

The thermal head 7 is located at a position where the printing tape 9 and the ink ribbon 12 overlap each other. A platen roller 17 presses the printing tape 9 and the ink ribbon 12 against the thermal head 7. A feed roller 45 presses the printing tape 9 (which now contains printed characters) and double-sided adhesive tape 15 against the bonding roller 10. The platen roller 17 and the feed roller 45 are rotatably supported by a support member 46. The thermal head 7 has a heating element assembly 11 composed of 48 heating elements arranged vertically to extend across the tape width, as shown in FIG. 4.

In operation, the bonding roller 10 and the take-up spool 14 are driven in synchronism in their respective directions by a tape feed motor 18 (FIG. 3) while the heating element assembly 11 is being powered to form characters on printing tape 9. This causes a plurality of dot columns (dot strings) to be printed on the printing tape 9 to form characters thereon, as depicted in FIG. 4. The printing tape 9 with the double-sided adhesive tape 15 adhered thereto is fed in the direction of arrow A out of the body frame 2. For a more detailed description of the printing mechanism PM refer to European Unexamined Provisional Patent Publication No. 0 364 305, which corresponds to the above-incorporated U.S. Pat. No. 4,927,278.

Figure 3:
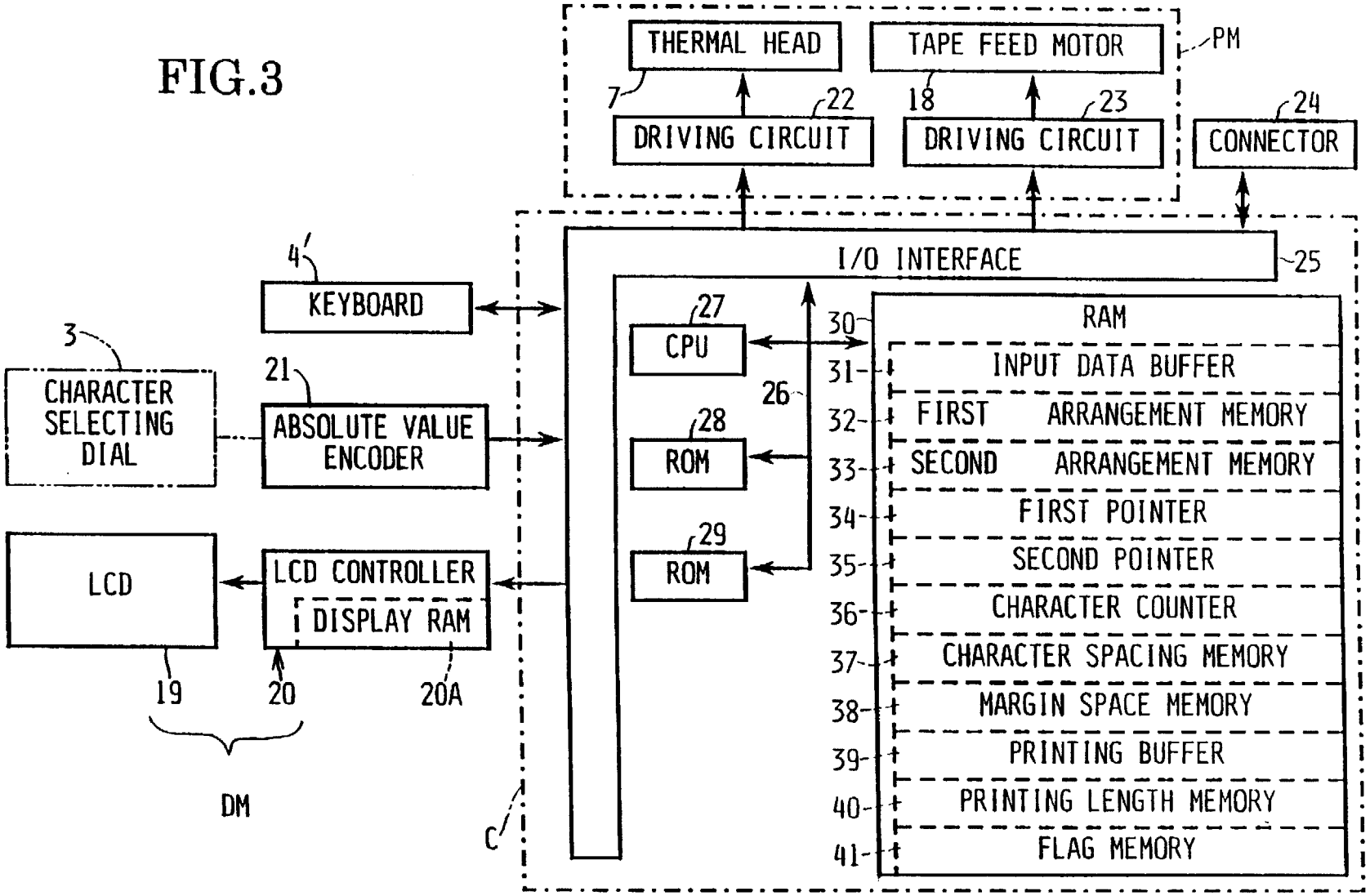
FIG. 3 is a block diagram of a control system for use with the FIG. 1 tape printer in which the first embodiment of the present invention is practiced.

The control system of the tape printer 1 is constructed as shown in FIG. 3. Display mechanism DM is a conventional arrangement comprising the LCD 19 and an LCD controller 20. The LCD controller 20 includes a display RAM 20A for outputting display data to the LCD 19. An absolute value encoder 21, connected to the character selecting dial 3, outputs 50 absolute value encoder signals ENS corresponding to the 50 stop positions of the dial 3. Each of the absolute value encoder signals ENS and a signal from the font selecting key (provided on keyboard 4'), allow the code data for a character at the character selecting position mark 6 to be obtained when setting key 5 is pressed. Comparing the absolute value encoder signal ENS (that is, the ENS output when the selecting operation is performed) in effect before the selecting operation with the current absolute value encoder signal ENS provides the rotating direction of the character selecting dial 3, and the amount of its rotation. A driving circuit 22 drives the thermal head 7, and a driving circuit 23 drives the tape feed motor 18.

A controller C comprises a CPU 27, an I/O interface 25 connected to the CPU 27 via a bus 26 (e.g., a data bus), ROMs 28 and 29, and a RAM 30. The ROM 28 (a program memory) contains a display control program, a data storage control program, a driving control program and a tape printing control program. The display control program controls the display mechanism DM in accordance with the code data selected by the character selecting dial 3, and command data provided by selecting the keys on keyboard 4. The data storage control program stores into an input data buffer 31 the character code data defined by operation of the setting key 5 as well as various types of set command data (e.g., font, single- or double-line printing, etc.) about printing-related settings. The driving control program controls the driving of the thermal head 7 and the tape feed motor 18 by successively reading data (for example, one data column at a time) from a printing buffer 39. The tape printing control program will be described later in more detail.

The ROM 29 (a pattern data memory) contains two different types of dot pattern data for each of the numerous (100) characters inscribed on the character selecting dial 3. One data type is SS character pattern data comprising matrix data having a size of 16 dots character pattern data comprising matrix data having a size of 48 dots (high) by 48 dots (across). The SS character pattern data are used to display characters on display 19 and to print two lines of characters at a time, while the L character pattern data are used to print a single line of characters. A connector 24 may be attached to an optional ROM card containing dot pattern data for various fonts.

The input data buffer (RAM) 31 contains the code data for characters to be printed (i.e., characters selected with dial 3 and setting key 5) as well as various types of set command data regarding printing-related settings. (See, for example, FIG. 18: "A" in a notation "A0000" indicates that this is an address which applies to the input data buffer 31, and which begins at location "A0000"). A first arrangement memory 32 stores the character code data for single-line printing, and the upper-line character code data for double-line printing. (See, for example, FIG. 19: "a" in a notation "a0000" indicates that this is an address which applies to the first arrangement memory 32, and which begins at location "a0000"). A second arrangement memory 33 contains the lower-line character code data for double-line printing. (See, for example, FIG. 19: "b" in a notation "b0000" indicates that this is an address which applies to the second arrangement memory 33, and which begins at location "b0000"). A first pointer 34 stores one of the addresses in the first arrangement memory 32, and a second pointer 35 stores one of the addresses in the second arrangement memory 33. In the present specification, all numbers representing addresses are provided in hexadecimal notation.

Figure 23:
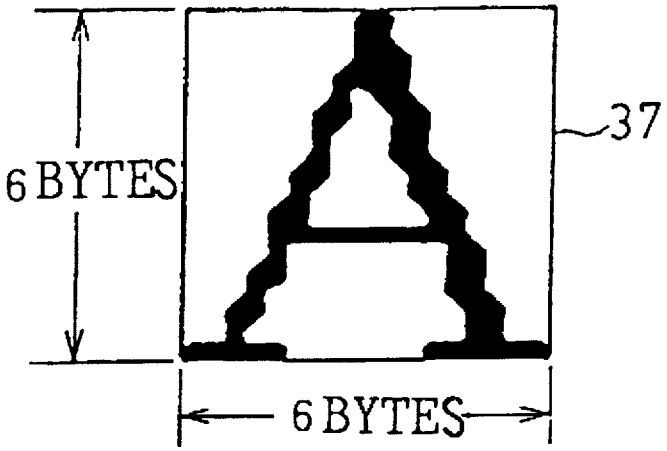
FIG. 23 is a view schematically depicting dot pattern data for one double size character in a printing buffer.

A character counter 36 stores the number of characters to be printed, including spaces input by the operator. A set character spacing memory 37 stores a space value that equally separates adjacent characters from one another as they are printed over an operator input fixed length. A margin space memory 38 contains the number of margin dot columns output as the remainder Sd when a margin space YS is divided by the number of characters to be printed. (This will be described in more detail below). The printing buffer 39, as illustrated in FIG. 23, has a capacity large enough to accommodate 48 dots in height (i.e., in a dot column direction; also referred to as a string of dots) corresponding to 48 bits (6 bytes) of information, and 48 dots in width corresponding to 48 bits (6 bytes) of information. The dot pattern data of each character to be printed are sequentially read from the pattern data memory 29 and temporarily stored into the printing buffer 39 prior to printing each character (this will be [descried] *described* in more detail below). A printing length memory 40 stores the data regarding the fixed printing length selected by the operator. A flag memory 41 accommodates the data for various flags. These flags include a double-line printing flag F1 that is set (to "1") when double-line printing is selected; an upper-line printing flag F2 set (to "1") when upper-line (i.e., first line) printing is selected in double-line printing mode; a base line position display flag F3 set (to "1") when a setting for changing the printing base line position is displayed; a base line position change flag F4 set (to "1") when the printing base line position is changed (i.e., when a displayed base line position is changed from a normal (default) position); a display flag F5 set (to "1") when a setting for changing the printing base line position is displayed; a fixed length printing flag F6 set (to "1") when fixed length printing is selected; a remainder flag AF set (to "1") when a remainder is generated during character spacing determination; an error flag EF; and a font flag. In the remaining description, the terminology "flag is set" means that the flag is set to 1; "flag is reset" means that the flag is set to 0.

A description is now provided of the manner in which a tape printing control routine is executed by the controller C of the tape printer 1, with reference to the flowcharts of FIGS. 5A through 17B. In the figures, Si (i=1, 2, 3 . . . ) indicates a step. As shown in FIG. 4, characters can be printed in two ways using the described tape printing control routine. During single-line printing, characters are printed in a single line across the entire printing area PE, as illustrated by the character "A", on the printing tape 9. The printing area PE corresponds to the length of the heating element assembly 11 of the thermal head 7. When performing single-line printing, the printing is performed on the basis of L character pattern data. During double-line printing, the upper-line characters are printed along the upper printing line UL of the printing area PE, while the lower-line characters are printed along the lower printing line LL of the area PE. When performing double-line printing, the printing is performed in accordance with SS character pattern data. The normal printing base line PS1 for L characters is positioned at the bottom of the heating element assembly The printing base line PS2 for SS characters on the upper line is positioned 4 dots above the center line CL which bisects the heating element assembly 11. The normal printing base line PS3 for SS characters on the lower line is positioned 4 dots above the printing base line PS1. With this tape printing control routine in operation, characters, symbols and operator input spaces are all generically referred to as characters. The numbers 4, 16 and 48 in FIG. 4 indicate numbers of dots.

Figure 7A:
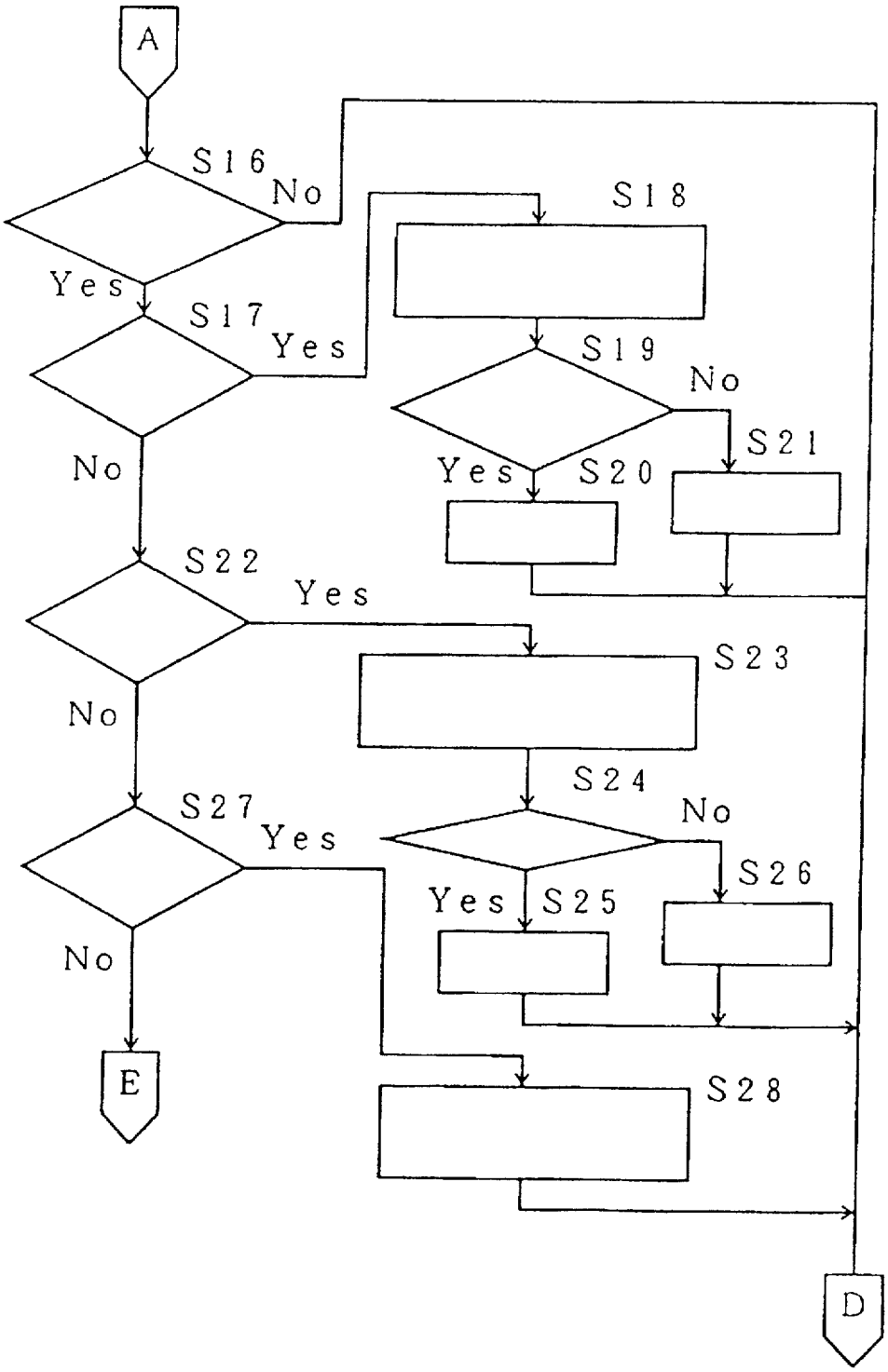

Applying power to the tape printer 1 starts execution of the tape printing control routine. Step S1 establishes initial settings which include clearing the display mechanism DM and the memories 31 through 40, displaying a single-line printing mark (>) on the LCD 19, and storing single-line printing command data to the start address in the input data buffer 31. When the character selecting dial 3 is rotated, step S1 is succeeded by step S2. In step S2, a check is made to determine whether any key input (i.e., setting key 5, the double-line printing key, the single line printing key, the fixed length key, the print key, etc.) is made. If there is no key input, flow proceeds to step S16 (FIG. 7A). In steps S16, S17, S22, S27, S29 and S31, determinations are made as to whether any of the flags F1, F3, F5, F6, . . . are set by determining (S16) whether there has been a change in the ENS (i.e., whether dial 3 has been rotated). If dial 3 was not rotated, the value of ENS does not change, and therefore flow returns to step S2. Thus, steps S2 and S16 repeat until one of their results is YES. If dial 3 was rotated (the YES output of S16), flow proceeds to step S17. If none of the flags are set, the results of steps S17, S22, S27, S29, *and* S31 [and S33] are NO, and therefore flow proceeds to step S33, where the character selected according to the encoder signal ENS from the absolute value encoder 21 is displayed on LCD 19. Step S33 is succeeded by step S2.

Figure 9A:
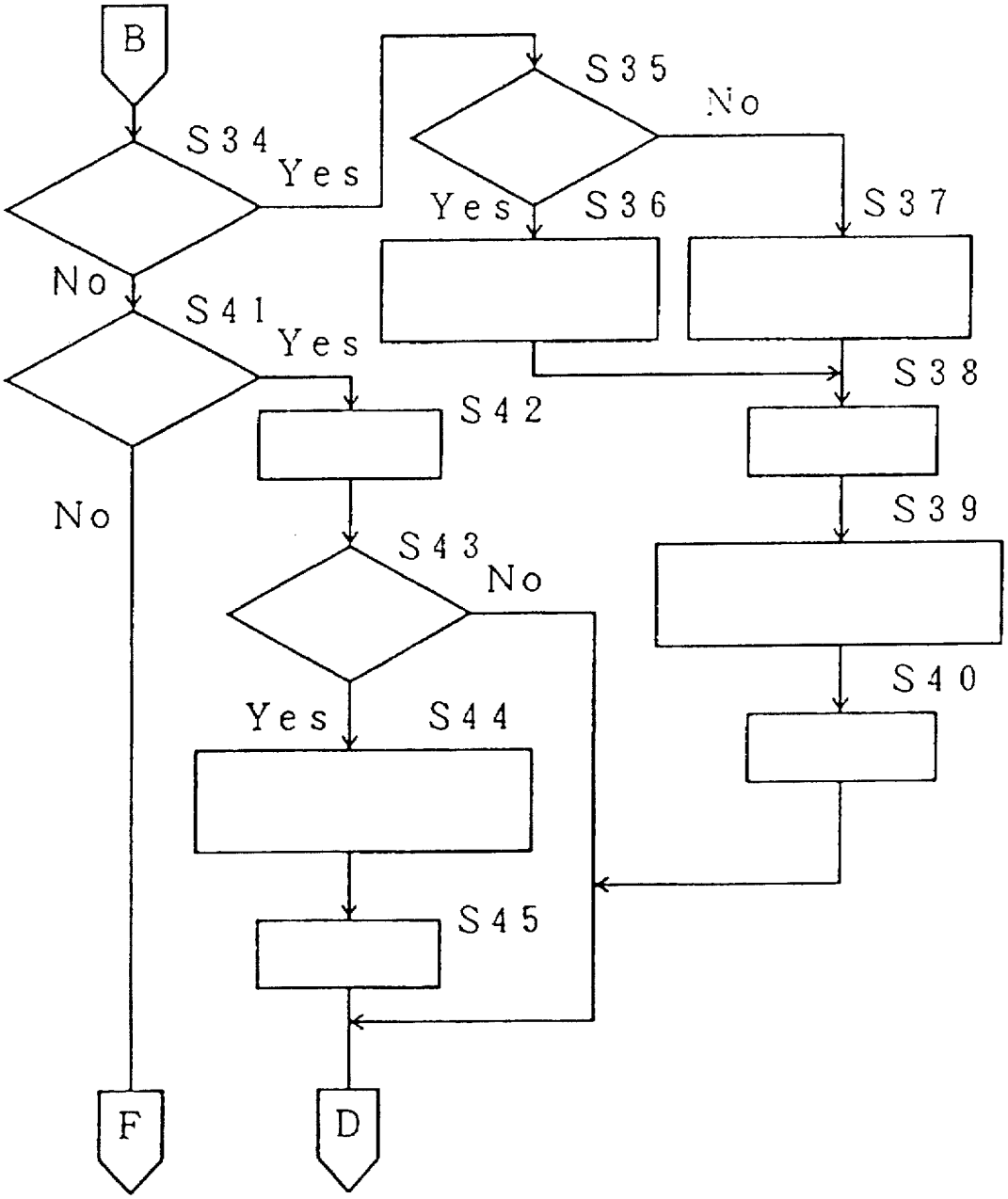

If a determination is made that a key was selected in step S2, flow proceeds to step S3. If the setting key 5 is actuated, step S2 is followed by steps S3 and S34 (FIG. 9A). If none of the flags F1, F3, F5 and F6 are found to be set, step S34 is followed by steps S41, S46, S49, S51, and S53, in that order. Thus, when S53 is reached, the operator desired to select the character displayed on LCD 19. Accordingly, step S53 selects the character currently displayed on the LCD 19 and stores the code data thereof to the input data buffer 31. For example, if the setting key 5 is operated to display characters "A", "B" and "C" on the LCD 19, the LCD 19 gives the indication shown in FIG. 1. In this case, the code data for the characters "A", "B" and "C" are stored successively into the input data buffer 31.

If, however, the double-line printing key is operated to execute double-line printing, step S2 is followed by steps S3, S4 and S5, in that order. Step S5 displays the first selected setting for double-line printing (e.g., an indication "UPPER PRINTING LINE") on the LCD 19. Step S5 is followed by step S6 in which the flag F1 is set. When the character selecting dial 3 is rotated next, step S2 is followed by steps S16 and S17. Since the flag F1 is set, step S17 is followed by step S18 in which the LCD 19 displays a different selected setting for double-line printing (e.g., an indication "LOWER PRINTING LINE"). In step S19, a check is made to determine whether the LCD 19 has the "UPPER PRINTING LINE" indication. If the LCD 19 is providing the "UPPER PRINTING LINE" indication, step S20 is reached in which the flag F2 is set. If the LCD 19 is giving the "LOWER PRINTING LINE" indication, step S21 is reached in which the flag F2 is reset. Thus, after selecting the doubleline printing key, the LCD 19 displays "UPPER PRINTING LINE" or "LOWER PRINTING LINE". The operator changes this display by rotating dial 3, and flag F2 is set or reset accordingly.

When the setting key 5 is operated next, step S2 is followed by steps S3 and S34 (FIG. 9A). If the two flags F1 and F2 are found to be set in steps S34 and S35, step S36 is reached. Step S36 displays an upper printing line mark "Δ" on the LCD 19 and stores into the input data buffer 31 the upper line printing command data corresponding to that mark. If the flag F2 is found to be reset in step S35, step S37 is reached. Step S37 displays a lower printing line mark "[□]v" on the LCD 19 and stores into the input data buffer 31 the lower line printing command data corresponding to that mark. Thus, if the setting key 5 is operated while the LCD 19 is giving the "UPPER PRINTING LINE" indication, the upper printing line mark "Δ" appears on the LCD 19 and the upper line printing command data are set to an address A0004 in the input data buffer 31 (see FIG. 18).

In step S38, the flag F1 is reset. In step S39, the LCD 19 displays the selected setting regarding the change in the printing base line position, e.g., an indication "NORMAL BASE LINE POSITION" which means that the printing base line position remains unchanged relative to the normal (default) printing base lines PS2 and PS3. In step S40, the flag F3 is set.

Figure 5A:
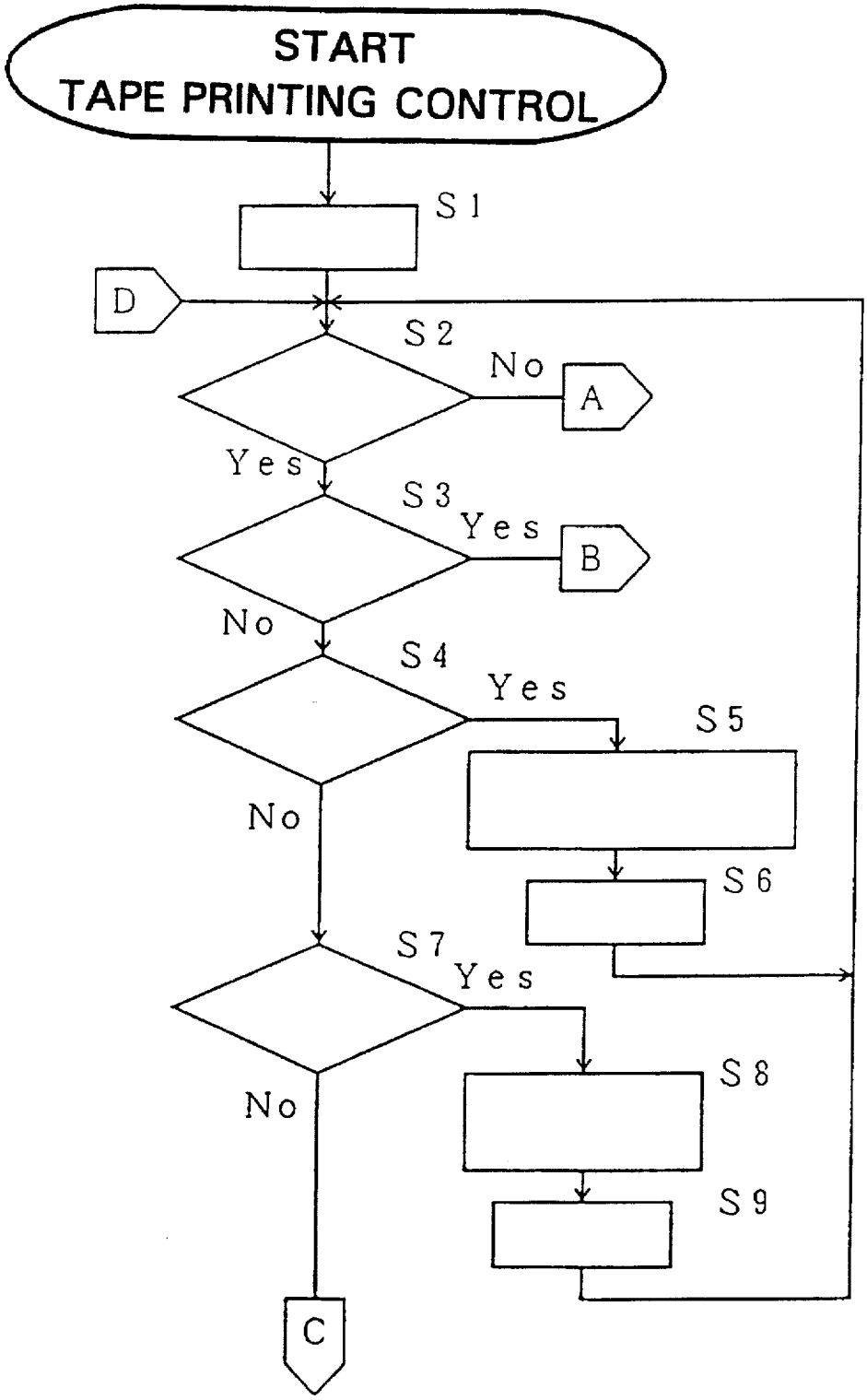

With reference to FIGS. 5A and 7A, when the character selecting dial 3 is rotated next, step S2 is followed by steps S16, S17 and S22. Since the flag F3 is found to be set in step S22, step S23 is reached. In step S23, the LCD 19 displays the next selected setting regarding the change in the printing base line position, e.g., an indication "BASE LINE POSITION CHANGED" which means that the printing base line position is changed. If the LCD 19 is found to have the "BASE LINE POSITION CHANGED" indication in step S24, step S25 is reached in which the flag F4 is set. If the LCD 19 is found to have the "NORMAL BASE LINE POSITION" indication in step S24, step S26 is reached in which the flag F4 is reset. Thus, once the "NORMAL BASE LINE POSITION" indication is provided on LCD 19, the operator rotates dial 3 if the operator desires to change the base line position, and then presses the setting key 5; otherwise the setting key 5 is pressed without rotating dial 1 when no base line position change is desired.

With reference to FIGS. 5A and 9A, when the setting key 5 is operated next, step S2 is followed by steps S3, S34 and S41, in that order. If the flag F3 is found to be set in step S41, step S42 is reached in which the flag F3 is reset. In step S43, if the flag F4 is found to be set (i.e., it is desired to change the base line position), step S44 is reached. In step S44, the LCD 19 displays the first selected setting for the printing base line position change, e.g., an indication "BASE LINE POSITION+4" which means that the printing base line is positioned 4 dots above the normal printing base lines PS2 and PS3 on the printing tape 9. In step S45, the flag F5 is set.

With reference to FIGS. 5A and 7A, when the character selecting dial 3 is rotated next, step S2 is followed by steps S16, S17, S22 and S27, in that order. Since the flag F5 is found to be set in step S27, step S28 is reached. In step S28, the LCD 19 displays the next selected setting regarding the printing base line position, e.g., an indication "BASE LINE POSITION+3". Thereafter, if the character selecting dial 3 is rotated continuously, the LCD 19 displays successively the selected settings "BASE LINE POSITION+2"; "BASE LINE POSITION+1"; "BASE LINE POSITION−1"; "BASE LINE POSITION−2"; "BASE LINE POSITION−3"; "BASE LINE POSITION−4"; "BASE LINE POSITION+4"; and so on. Each of the "BASE LINE POSITION−1" to "BASE LINE POSITION L 4" indications means that a shift of the printing base line position toward the lower edge of the printing tape 9 relative to the normal printing base lines PS2 and PS3 can be entered. The above control operations are carried out according to the absolute value encoder signals ENS that are output by the absolute value encoder 21.

Figure 10A:
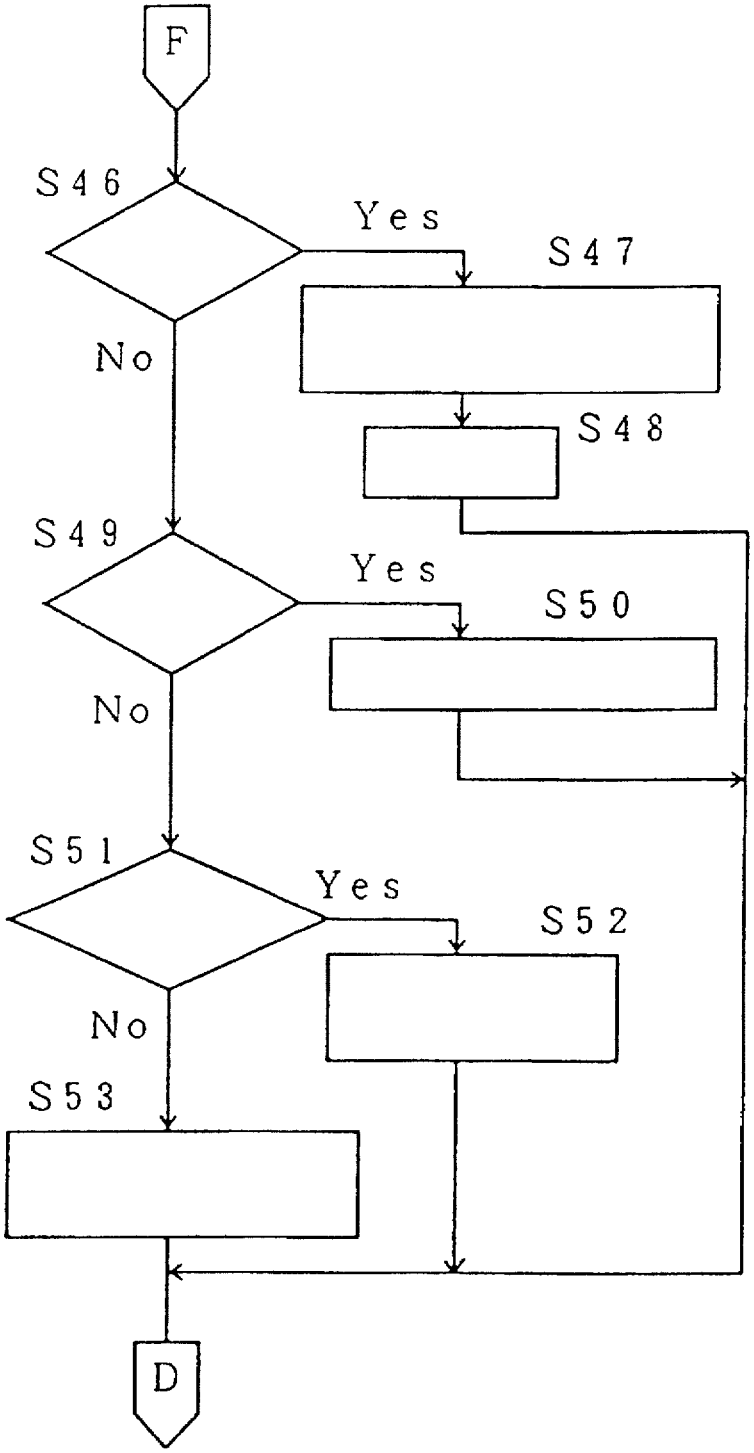

With reference to FIGS. 5A, 9A and 10A, when the setting key 5 is operated next, step S2 is followed by steps S3, S34, S41 and S46, in that order. Since the flag F5 is found to be set in step S46, step S47 is reached. Step S47 includes into the upper or lower line printing command data the printing base line position change amount data (for example, BASE LINE POSITION −4; BASE LINE POSITION +2; etc. corresponding to the selected setting displayed on the LCD 19. In step S48, the flag F5 is reset.

Figure 18:
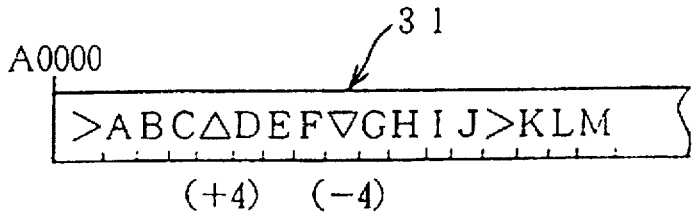
FIG. 18 is a view schematically depicting illustrative data in an input data buffer of the first embodiment of the present invention.

For example, assume that the setting key 5 is operated when the LCD 19 displays the selected setting "BASE LINE POSITION+4". In that case, as shown in FIG. 18, the change amount data "+4 dots" are included into the upper line printing command data at address A0004. Then, the code data about subsequently selected characters "D", "E" and "F", the lower line printing command data containing the change amount data "−4 dots", and the code data for characters "G", "H", "I" and "J", which are later selected, are successively stored into the input data buffer 31.

With reference to FIG. 5A, when the single-line printing key is operated for single-line printing, step S2 is followed by steps S3, S4, S7 and S8, in that order. In step S8, the LCD 19 displays the single-line printing mark (>) and the single-line printing command data are stored into the input data buffer 31. In step S9, the flag F1 is reset. For example, as depicted in FIG. 18, the input data buffer 31 accommodates the single-line printing command data at address A000D followed by the code data about subsequently selected characters "K", "L" and "M" at addresses A000E through A0010, respectively. Next, with reference to FIGS. 5A, 7A and 8, if flags other than F1, F3, F5 and F6 are found to be set when the character selecting dial 3 is operated, step S2 is followed by steps S16, S17, S22, S27, S29, S31 and S32. In step S32, the LCD 19 displays successively the selected settings about the flags that are found to be set. Such other flags are not part of the present invention, and thus no further explanation is required.

Figure 6:
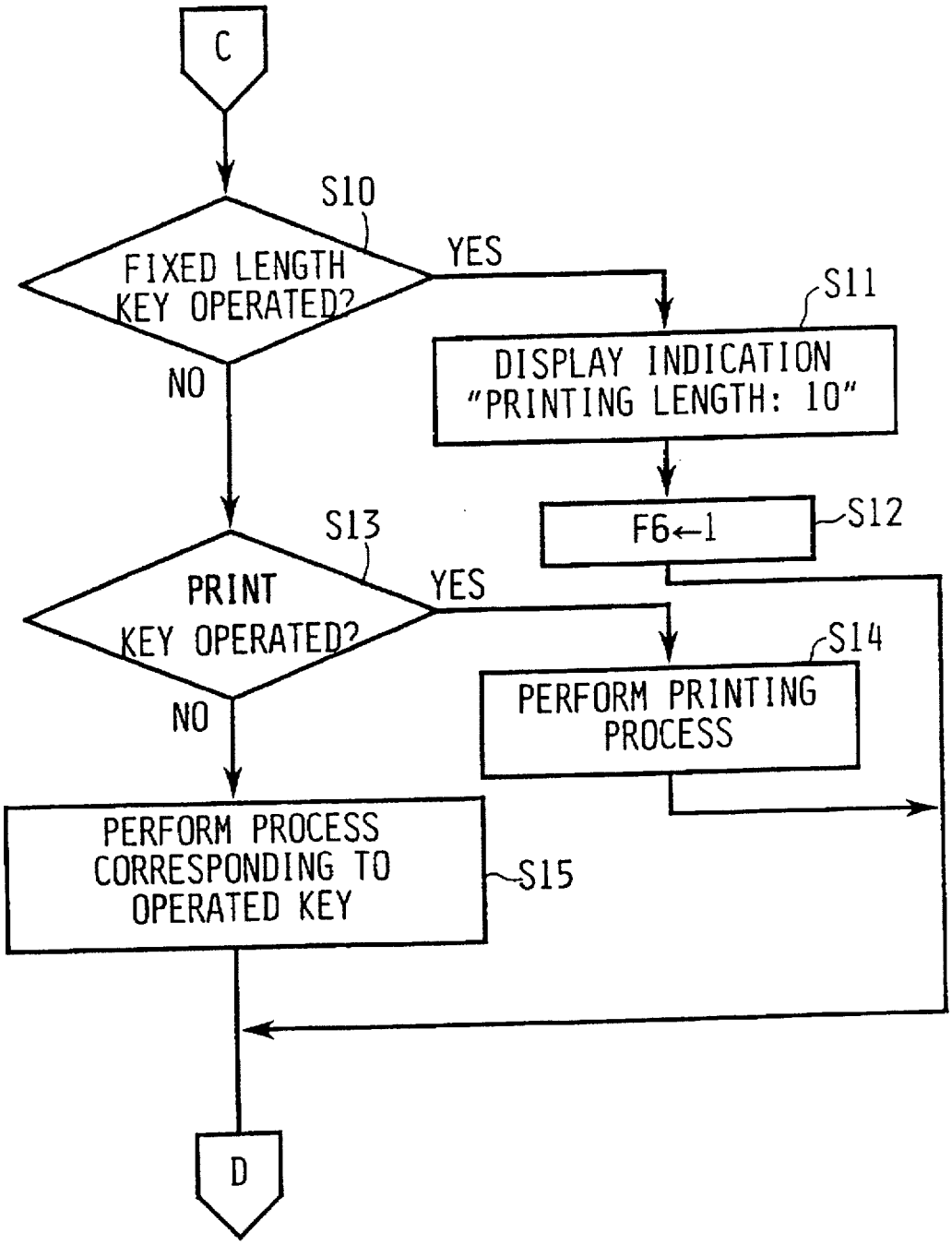
FIG. 6 is another partial flowchart outlining the tape printing control routine for use in the first embodiment of the present invention.
Figure 8:
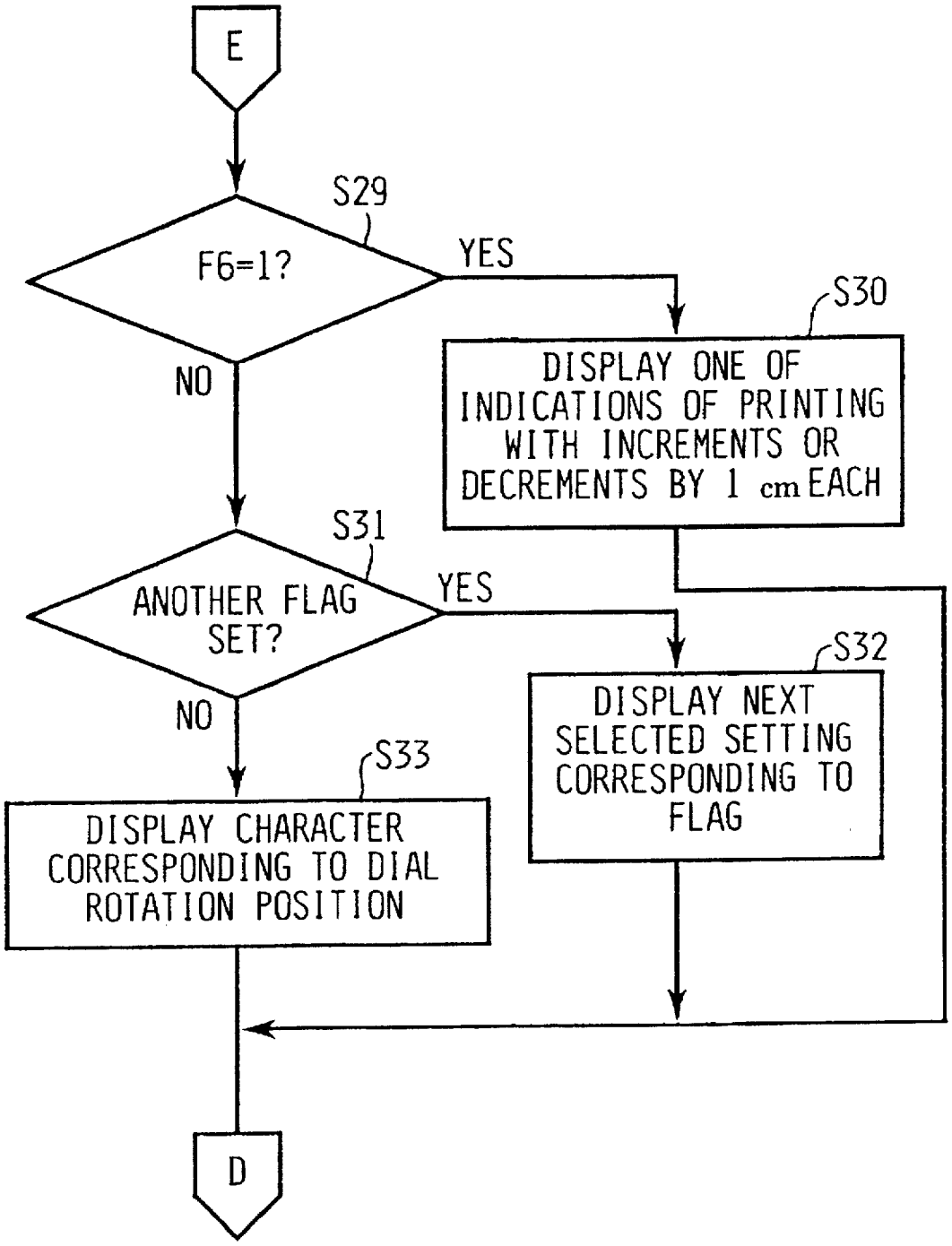
FIG. 8 is another partial flowchart outlining the tape printing control routine of the present invention.

With reference to FIGS. 5A and 6, if the fixed length setting key is operated for fixed-length printing, step S2 is followed by steps S3, S4, S7, S10 and S11. In step S11, the LCD 19 gives an indication "PRINTING LENGTH: 10", which means that the length of the printing range is set for 10 cm. In step S12, the flag F6 is set. Referring to FIGS. 5A, 7A and 8, when the character selecting key 3 is rotated next, step S2 is followed by steps S16, S17, S22, S27 and S29, in that order. Since the flag F6 is found to be set in step S29, step S29 is succeeded by step S30. In step S30, the LCD 19 provides an indication "PRINTING LENGTH: 11" in accordance with the clockwise rotation of the character selecting dial 3. Thereafter, if the character selecting dial 3 is continuously rotated clockwise, the LCD 19 displays successively the selected settings "PRINTING LENGTH: 12", "PRINTING LENGTH: 13", "PRINTING LENGTH: 14", "PRINTING LENGTH: 15", etc., up to "PRINTING LENGTH 54", in that order. If the character selecting dial 3 is rotated counterclockwise, the above indications are reversed, i.e., down to "PRINTING LENGTH: 5" on the LCD 19. If the character selecting dial 3 is rotated clockwise when the indication "PRINTING LENGTH: 54" is on the LCD 19, the LCD 19 thereupon displays "PRINTING LENGTH: 5". If the character selecting dial 3 is rotated counterclockwise when the indication "PRINTING LENGTH: 5" is on the LCD 19, the LED 19 thereupon displays "PRINTING LENGTH: 54". Thus, printing lengths from 5–54 cm can be selected. These control operations are carried out according to the absolute value encoder signals ENS that are output by the absolute value encoder 21 connected to the character selecting dial 3.

Once the desired fixed printing length is displayed on LCD 19, and referring to FIGS. 5A, 9A and 10A, when the setting key 5 is operated next, step S2 is followed by steps S3, S34, S41, S46 and S49, in that order. Since the flag F6 is found to be set in step S49, step S49 is succeeded by step SS50 in which the data for the selected printing length are stored into the printing length memory 40. On the other hand, if a flag other than F1, F3, F5 or F6 is found to be set when the setting key 5 is operated, step S2 is followed by steps S3, S34, S41, S46, S49 and S51, in that order. With that flag found to be set in step S51, step S52 is reached in which the selected setting (not a part of the present invention) corresponding to the flag is established.

Once the desired characters and other information have been stored in memory, referring to FIGS. 5A and 6, when the printing key is operated, step S2 is followed by steps S3, S4, S7, S10, S13 and S14, in that order. Step S14 starts control over the printing process (see FIGS. 11A–12B). When printing process control is started, step S60 is reached in which various flags and memory contents regarding printing are initialized. Succeeding step S60, step S61 executes arrangement process control (FIGS. 13A–B). Arrangement process control will now be described with reference to FIGS. 13A and 18 through 22. With this control process started, all code data in the input data buffer 31 are stored into the first arrangement memory 32 in step S90. End data "FF" are added to the end of these code data.

In step S91, the start address a0000 of the first arrangement memory 32 is assigned to a first pointer 34. (Hereafter, the content of the first pointer 34 is referred to as P1, and the first pointer itself is designated in FIGS. 19 and 20 by P1.) In step S92, the data pointed to by the first pointer P1 in the first arrangement memory 32 are read therefrom. If the read-out data is determined to be the single-line printing command data in step S93, step S93 is followed by steps S105, S103 and S104, in that order. Step S104 sets the next address to the first pointer P1, and step S92 is reached again. If the read-out data is determined to be character code data in step S93, the above control operations are again repeated.

Figure 19:
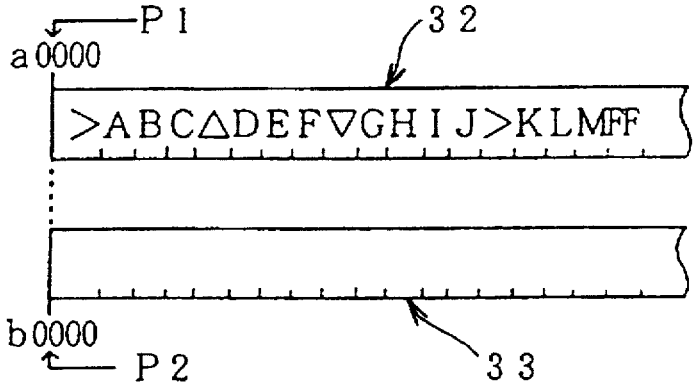
FIG. 19 is a view schematically depicting the data of FIG. 18 in first and second arrangement memories.
Figure 20:
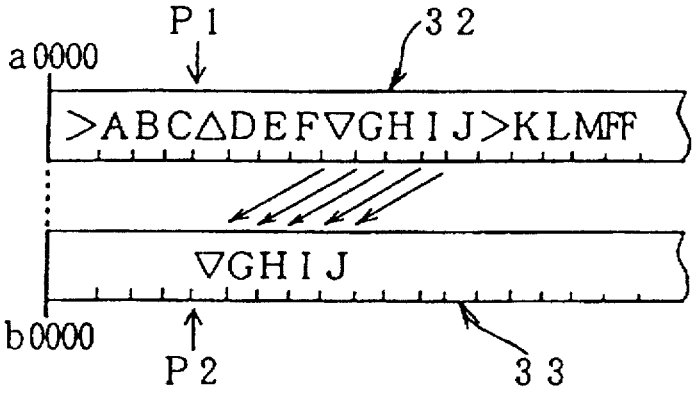
FIG. 20 is another view schematically depicting the data of FIG. 19 in the first and the second arrangement memories wherein data for a lower printing line is placed into the second arrangement memory.

In the example of FIGS. 18–20, and as specifically illustrated in FIG. 20, when the first pointer P1 has an address a0004, the data is determined to be the upper-line printing command data in step S93. Then step S93 is followed by step S94 in which the first arrangement memory 32 is searched using the first pointer P1. If it is found, in step S95, that the first arrangement memory 32 contains the lower-line printing command data next to the upper-line printing command data, step S95 is reached. In step S96, as shown in FIG. 20, the address b0004 corresponding to the first pointer P1 is set to a second pointer 35. In the illustrated example, since the address of the first pointer in first arrangement memory 32 was a0004, the second pointer receives the address of b0004 in the second arrangement memory 33. (Hereafter, the content of the second pointer 35 is referred to as P2, and the second pointer itself is designated in FIGS. 19 and 20 by P2.) Then, the lower-line printing command data and the subsequent code data for the characters to be printed in the lower printing line (LL) are set to the addresses following the address of the second pointer P2.

Additionally, there is counted the number of character code data (the number of characters) that are read out between the time the upper-line printing command data are read from the first arrangement memory 32 in step S93 and the time the lower-line printing command data are searched for and retrieved from the first arrangement memory 32 in step S95. These character code data are counted as the number of code data UDN for the characters printed in the upper printing line UL. There is also counted the number of character code data that are consecutively read from the first arrangement memory 33 and stored into the second arrangement memory 33 after the search through the first arrangement memory 32 for the lower line printing command data in step S96. These character code data are counted as the number of code data LDN for characters printed in the lower printing line LL.

Figure 21:
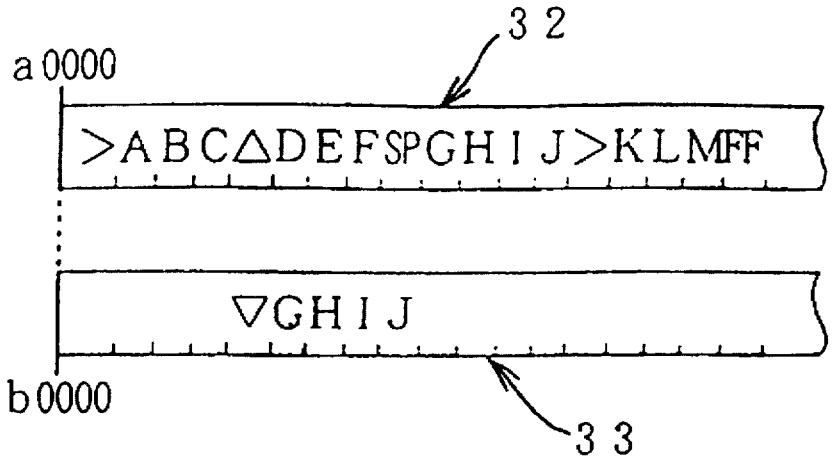
FIG. 21 is another view schematically depicting data in the first and the second arrangement memories after the lower printing line command data is replaced with space data in the first arrangement memory.
Figure 22:
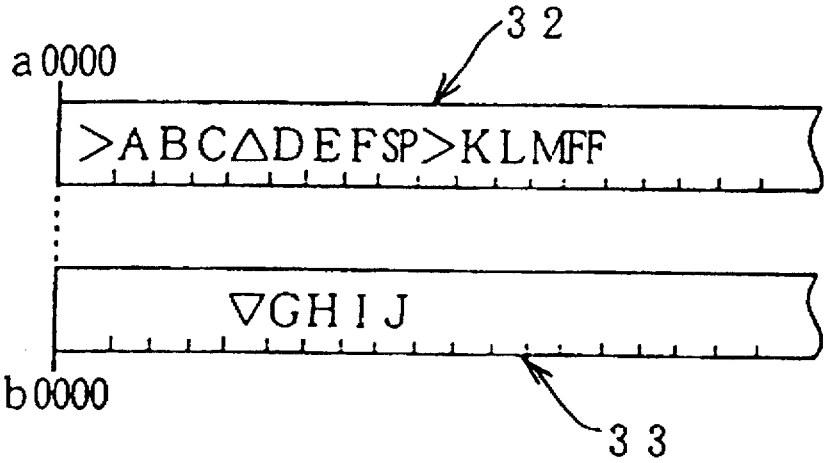
FIG. 22 is another view schematically depicting data in the first and the second arrangement memories after the lower line character data is deleted from the first arrangement memory.

In step S98, if the code data count UDN (number of code data on the characters printed in the upper printing line UL) is found to be smaller than the code data count LDN (number of code data on the characters printed in the lower printing line LL), step S101 is reached via step S100. In step S101, as illustrated in FIG. 21, a space code SP is assigned to an address a0008 (the address previously storing the lower line command data) in the first arrangement memory 32. If the code data count UDN is found to be greater than the code data count LDN in step S98, step S99 is reached in which a space code SP is set to an appropriate address (the address after the last character data) in the second arrangement memory 33. Steps S99 and S101 are followed by step S102. If the code data count UDN is equal to the code data count LDN, step S98 is followed by step S102 via step S100. In step S102, the contents of the first arrangement memory 32 are arranged. The arrangements include erasing the data stored into the second arrangement memory 33 and advancing the remaining data such as ">", "K", "L", "M" and "FF", as depicted in FIG. 22. If, in step S103, data remains to be searched in the first arrangement memory 32, step S104 is reached in which the next address (b0009 in the present example) is set to the first pointer P1. This is the next address to be searched.

For each of the subsequent data ">", "K", "L" and "M", steps S92, S93, S105, S103 and S104 are repeated, in that order. When the end data "FF" are reached in step S103, the control process of FIG. 13A is terminated and control is returned to the flowchart of FIG. 11A (S61).

In FIG. 13A, if the lower line printing command data are not found to exist in step S95, step S97 is reached. In step S97, a space code SP corresponding to the code data count UDN (number of characters printed in the upper printing line UL) is stored into the second arrangement memory 33. If the data read out for the first pointer P1 are found to be the lower line printing command data in step S93, step S106 is reached via step S105. In step S106, the address in the second arrangement memory 33 and corresponding to the first pointer P1 is assigned to the second pointer P2, and the lower line printing command data and the subsequent code data for the characters to be printed in the lower printing line LL are assigned to the addresses following the address of the second pointer P2 in the second arrangement memory 33. In step S107, the lower line printing command data and the code data for the characters to be printed in the lower printing line LL are all converted to space codes in the first arrangement memory.

Figure 11A:
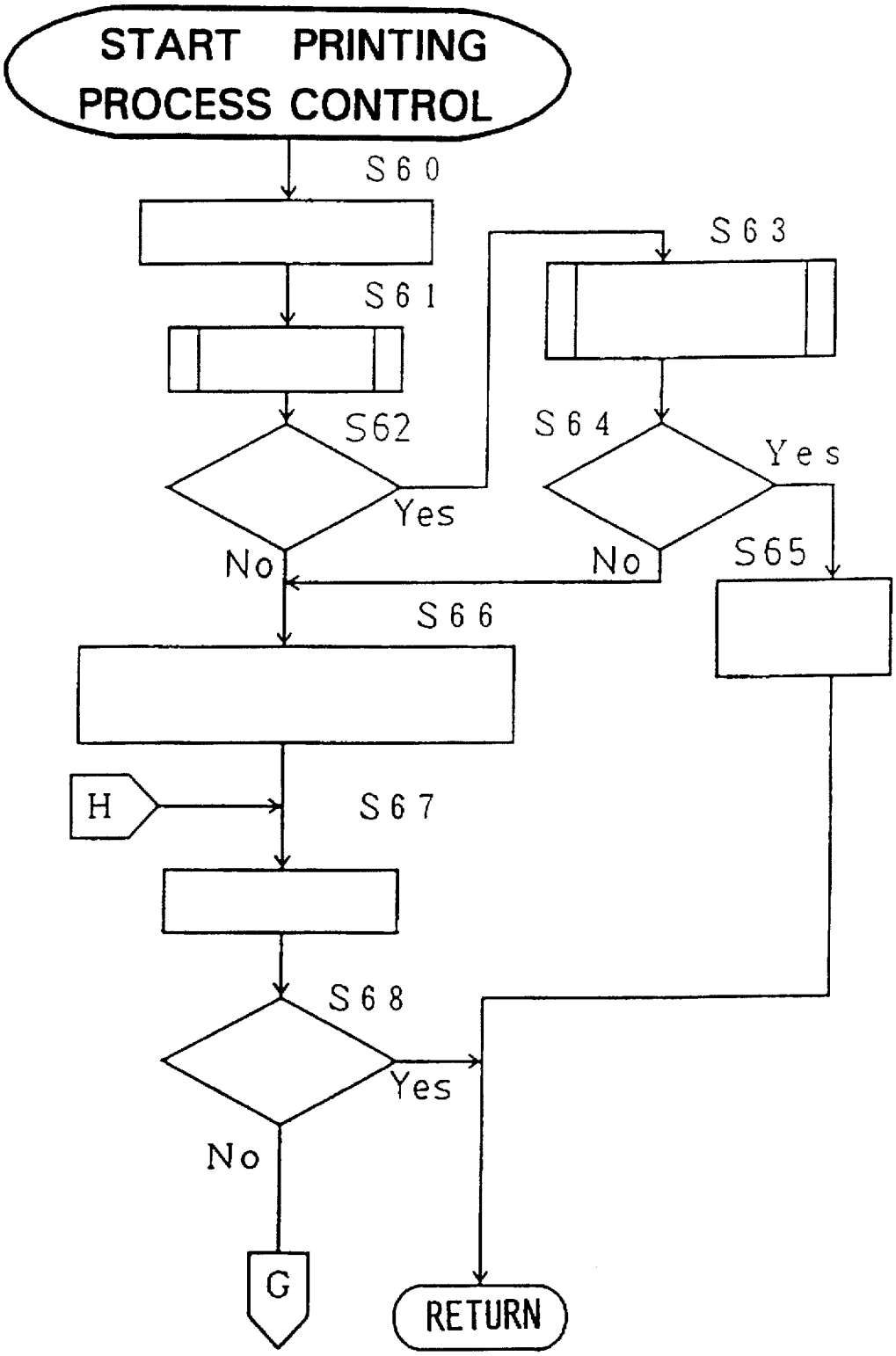

Control is then returned to the printing process control routine (FIG. 11A). In step S62, if the flag F6 is found to be set (i.e., fixed length printing selected), step S63 is reached in which character spacing determining process control is executed (see FIGS. 14 and 15). When this routine is started, step S110 is entered. Step S110 clears the character count MN in the character counter 36 to zero, and also clears to zero the set space value SA as well as the total character width MW in the set character spacing memory 37. In step S111, the start address of the first arrangement memory 32 is assigned to the first pointer P1. In step S112, the data pointed to by the first pointer P1 are read out. If the read-out data is neither end data nor code data (i.e., printing command data), step S112 is followed by steps S113, S114 and S115, in that order. In step S115, either the L size or the SS size character width PW (dot column count) is selected for the read-out printing command data and is stored in the RAM 30. Step S115 is succeeded by step S118 in which the first pointer P1 is incremented. If the read-out data is code data in step S114, step S116 is reached in which the character count MN is incremented by 1. Step S116 is followed by step S117 in which the total character width MW (dot column count) is incremented by the character width PW. Step S117 is followed by step S112 via step S118.

Steps S112 through S118 are repeated so that the total character width MW, i.e., the dot column count required to print all characters contained in the first arrangement memory 32, will be counted. Since the first arrangement memory 32 contains the character data for all single-lines to be printed and all upper lines to be printed, and since the length of each upper line is equal to the length of its corresponding double-line, the entire distance required for printing characters can be determined with reference to only the first arrangement memory 32.

If the read-out data is the end data in step S113, step S119 (FIG. 15) is reached. In step S119, any unprintable length, comprised of the printing start and end portions, is subtracted from the defined printing length SL (converted to millimeters in the illustrative embodiment) contained in the printing length memory 40. The resulting difference is the actually printable length JL. Due to the manner in which the printing mechanism PM comprising the thermal head (7) arrangement is structured relative to the printing tape 9, unprintable portions may exist at the beginning and at the end of the printing range. In the described embodiment, 17 mm cannot be printed at both the start and end portions of the tape, and therefore the unprintable length is 34 mm (17 mm ×2). With the first embodiment, about 71 dot columns may be printed over 1 cm. This means that, in step S120, the printable dot column count ND is obtained by multiplying the actual printing length JL by 7.1 (ND=7.1×JL). In step S121, a determination is made to determine whether the printable dot column count ND is equal to or greater than the total character width MW. If the result of S121 is affirmative, step S122 is reached. In step S122, the total character width MW is subtracted from the printable dot column count ND. The difference obtained is the remaining margin space YS (dot column count). In step S123, a determination is made as to whether the margin space YS is equal to or greater than the character spacing (MN−1). The character spacing (MN−1) is the number of inter-character positions (for example, 10 characters would result in 9 inter-character positions). If the result of S123 is affirmative, step S124 is reached. In step S124, one-dot column space may be inserted between each adjacent character. Thus the character spacing MN−1) is subtracted from the margin space YS to give the new margin space YS. In step S125, the set space value SA is incremented by one dot column. Then step S123 is again reached.

Figure 14:
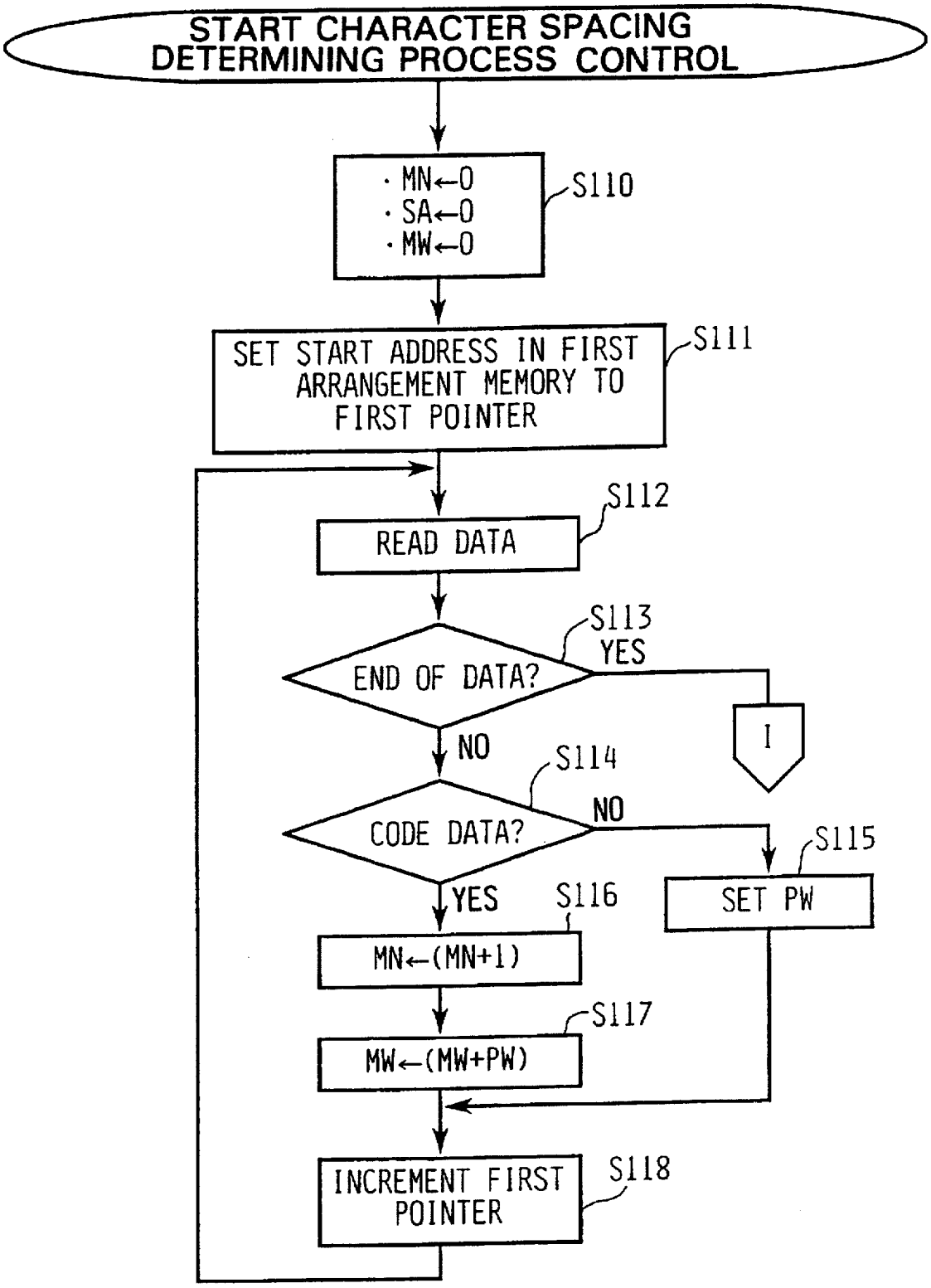
FIG. 14 is a partial flowchart outlining a character spacing determining process control routine for use with the printing process control routine of the present invention.
Figure 15:
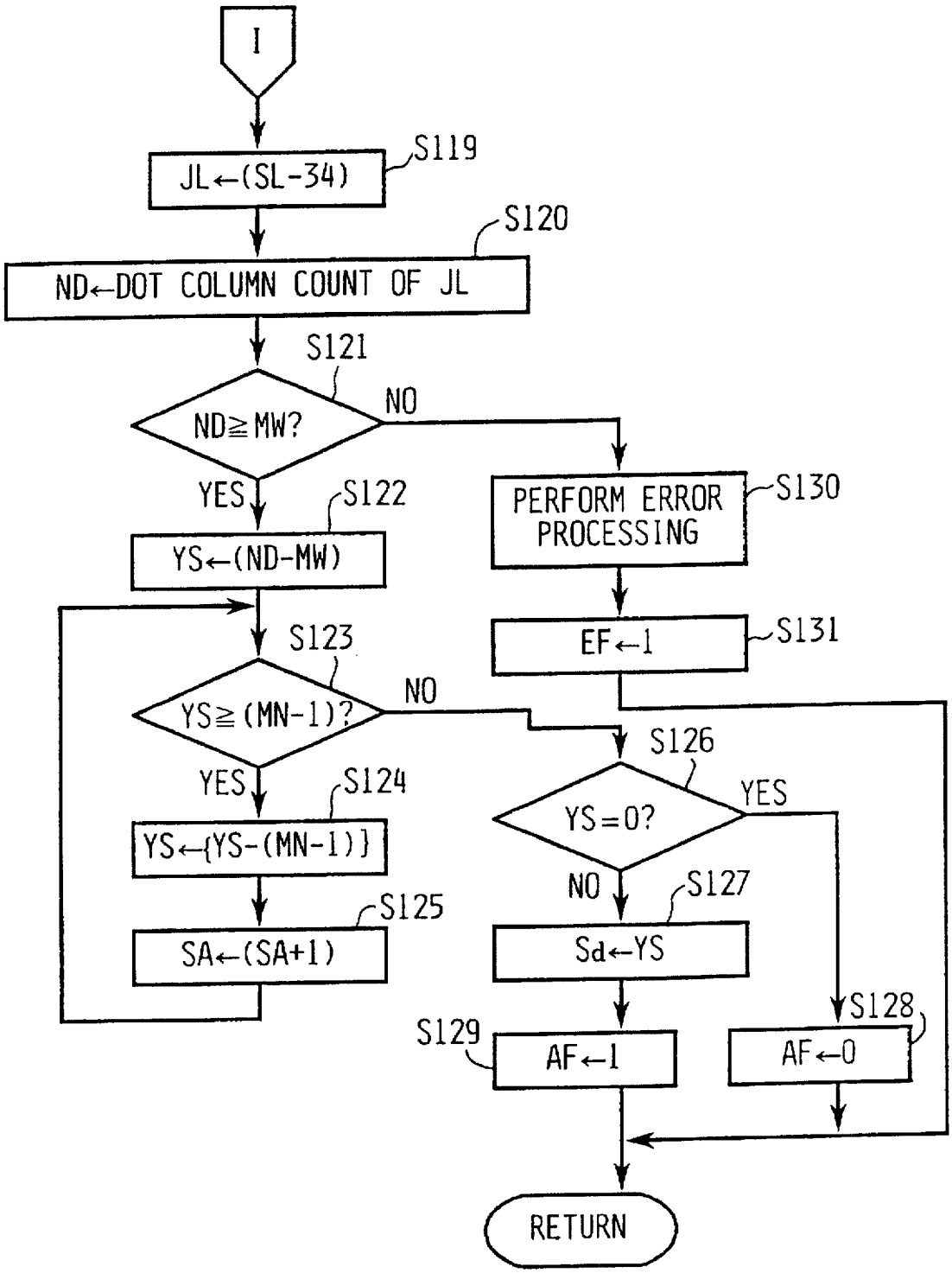
FIG. 15 is another partial flowchart outlining the character spacing determining process control routine of the present invention.

Steps S123, S124 and S125 are repeated until the margin space YS determined in S124 becomes smaller than the character spacing (as determined in step S123). In that case, step S126 is reached in which a check is made to determined whether the margin space YS is zero. If the margin space YS is not zero, step S127 is reached. Step S127 stores the margin space YS that exists as a remainder space Sd into the margin space memory 38. In step S129, the flag AF is set. Thus, Sd contains the number of spaces which remain after performing the character spacing determining process. This completes the above control process and control is returned to step S64 (FIG. 11A). If the margin space YS is found to be 0 in step S126, step S128 is reached in which the flag AF is reset, and control is returned as above. Thus, after the routine of FIGS. 14–15 is completed, a space value SA, equal to the number of columns of space which can be inserted between each character so as to evenly space each character across a fixed printing length is returned. Additionally, if all available spaces can be equally distributed between all characters, Sd=0 and AF=0. However, if some spaces remain to be inserted (i.e., when the difference between the actual printing length and the total character width (ND-MW) is not an integer multiple of the inter-character spaces (MN−1)) the number of remaining spaces is returned as Sd, and AF=1.

If, in step S121, the actual printing length JL determined in step S119 is found to be incapable of accommodating the input characters to be printed, step S130 is reached to handle the error. The error processing in step S130 includes displaying an error message "FIXED LENGTH PRINTING IMPOSSIBLE" on the LCD 19. In step S131, the flag EF is set, and control is returned. If, in step S64 (FIG. 11A), the flag EF is found to be reset, step S66 is reached. If the flag EF is found to be set in step S64, step S65 is reached in which the two flags F6 and EF are reset. Then control is returned to step S14 (FIG. 6).

Meanwhile, if the character spacing determination is completed, but the fixed length printing is not selected (i.e., flag F6 is 0) in step S62, step S66 is reached. In step S66, the start address of the first arrangement memory 32 is set to the first pointer P1. In step S67, data are read from the first arrangement memory 32 according to the first pointer P1. If, in step S68, the read data is the single-line printing command data, step S67 is followed by steps S68, S69, S70 and S71, in that order. In step S71, the flag F1 is reset. In step S73, the L size character width PW (48 dots) used for single-line printing in accordance with the value of flag F1 is placed in the RAM 30. In step S74, the first pointer P1 is incremented, and step S67 is reached again. If the read data are the code for a character, for example, character "A", step S67 is followed by steps S68, S69 and S75, in that order. If it is found, in step S75, that the data are not for fixed length printing, step S77 is reached. If the data is for fixed length printing, step S75 is followed by step S78 via step S76 (remainder spacing process control routine; see FIG. 16).

Figure 16:
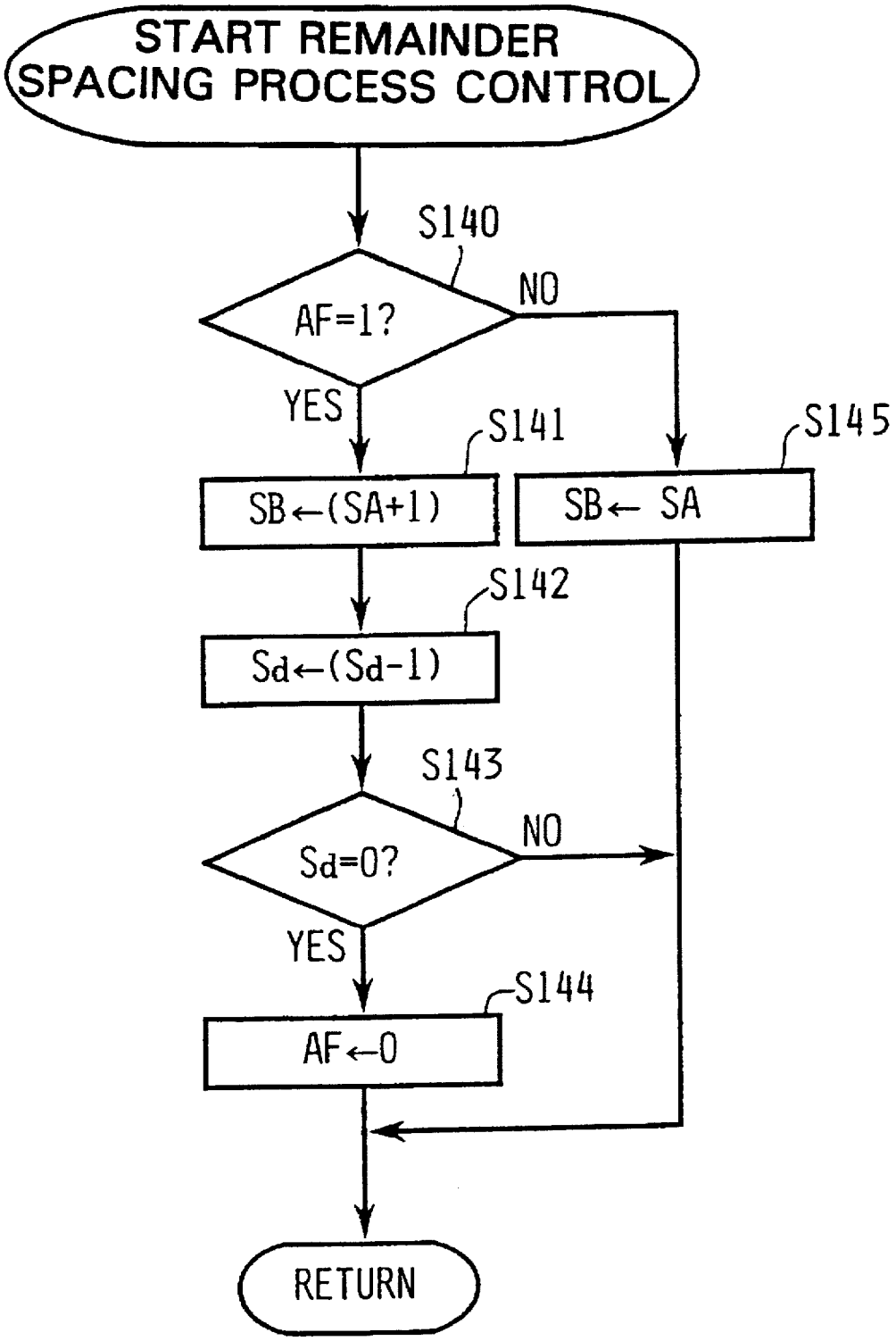
FIG. 16 is a flowchart outlining a remainder spacing determining process control routine of the present invention.
Figure 17A:
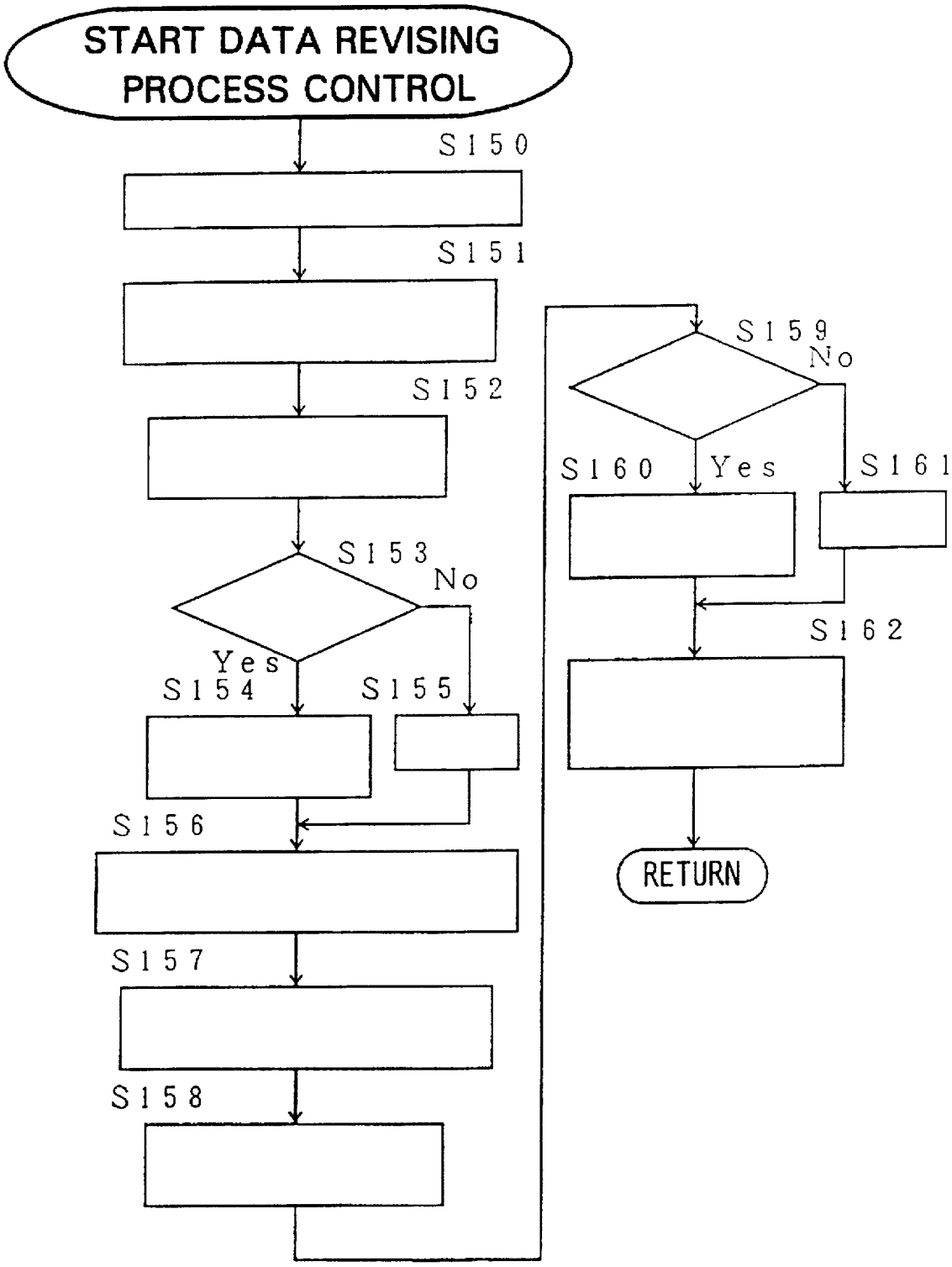

Described below is the operation of the remainder spacing process control routine, with reference to FIG. 16. Step S140 determines whether the flag AF is set. If the result of S140 is affirmative, step S141 is reached in which the set spacing value SA is incremented by one dot column, and the result assigned to SB. In step S142, the margin space value Sd is decremented by one dot column. If the margin space value Sd is found to be greater than 0 in step S143, this remainder spacing process control routine is terminated, and control is returned. If the margin space value Sd is found to be 0 in step S143, step S144 is reached in which the flag AF is reset. If the result of step S140 is NO, step S145 is reached in which the value of SA is assigned to Referring back to FIG. 12A, when the flag F1 is found to be reset in step S78, step S79 is reached. Step S79 reads the dot pattern data corresponding to the code data from the pattern data memory 29 and stores the dot pattern data into the printing buffer 39 (an example of the dot pattern data for the character "A" is shown in FIG. 23). In step S81, the character (for example, "A") is printed, and step S74 is reached. For fixed length printing, the printing in step S81 involves providing the space SB set in step S141 (or set in step S145 if the result of step S140 was NO) except when the printed character is the last character. If the printing is not for a fixed length (i.e., "No" in step S75), step S77 is reached. Step S77 sets a predetermined character spacing value of, for example, 3 dots. Step S77 is followed by step S78 and the subsequent steps carried out in the same manner described above.

After step S81 is completed, the first pointer is incremented by one in step S74, and then step S67 is repeated as described above. Thus, as long as Sd is greater than 0, an extra column space is inserted between adjacent characters (by assigning SB=SA+1) so that remaining spaces are distributed substantially evenly amongst the printed characters.

Predetermined character spacing values corresponding to various character sizes for unfixed length printing are stored in the ROM 28 beforehand. These values are selectively read from the ROM 28 in accordance with the size of the characters to be printed.

Figure 12A:
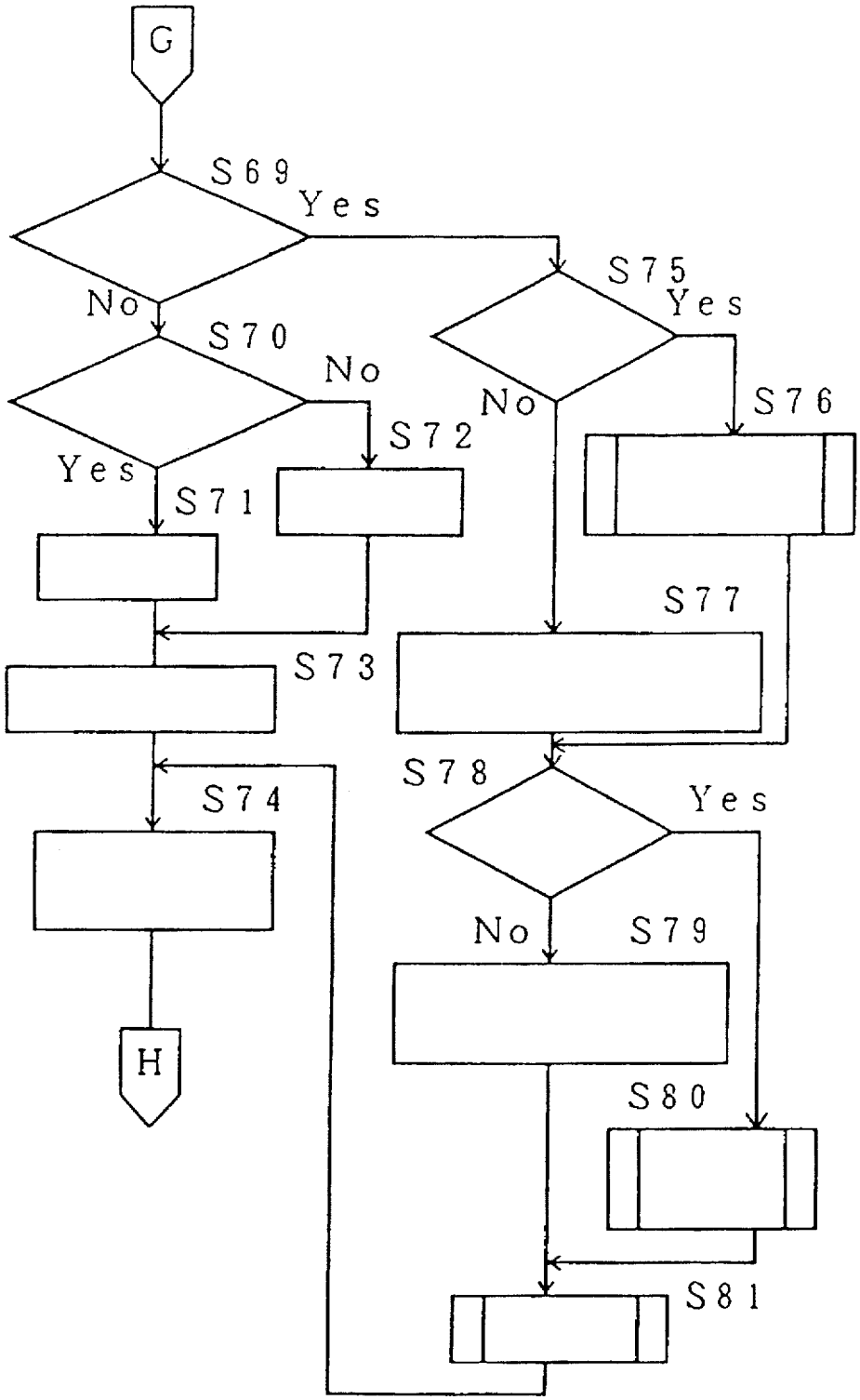
Figure 13A:
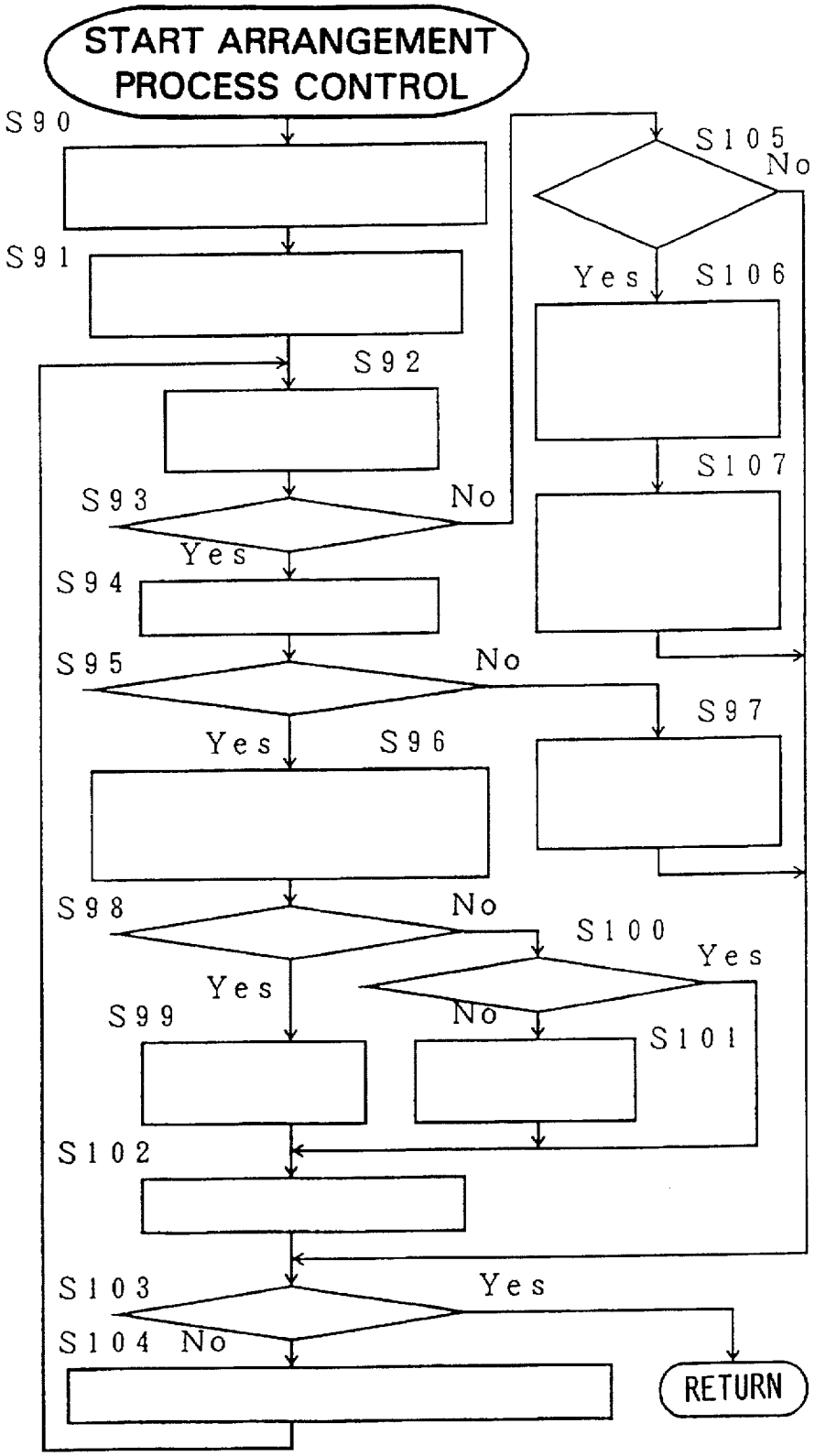

Referring to FIGS. 11A and 12A, if the read-out data are found to be the upper line printing command data, step S68 is followed by steps S69, S70 and S72, in that order. In step S72, the flag F1 is set. Step S72 is succeeded by step S73 which stores into the RAM 30 the SS size character width PW (16 dots) for double-line printing in accordance with the value of flag F1. Step S73 is again succeeded by S67 via step S74. In accordance with the described example, if the code data for the character "D" are read in step S67, step S67 is followed by steps S68 and S69. Step S69 is then followed by steps S75 through S77 in the same manner as before. If the printing is not for a fixed length ("No" in step S75), step S77 furnishes a character spacing value of, for example, 1 dot in accordance with the SS size characters for double-line printing. This character spacing value is selectively read from the ROM 28 in the same way that the character spacing value for L size characters is established.

Figure 24:
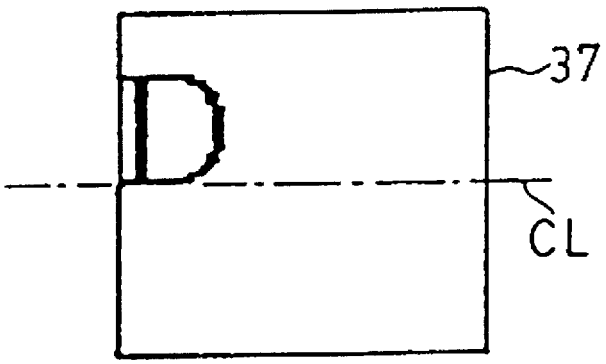
FIG. 24 is another view schematically depicting dot pattern data for a standard size character to be printed as upper line character data in a printing buffer.
Figure 25:
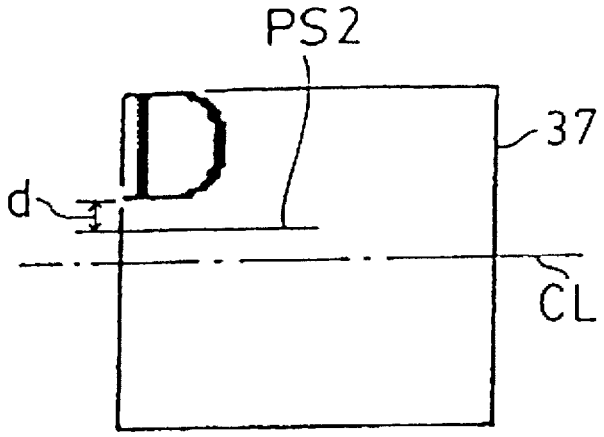
FIG. 25 is another view schematically depicting dot pattern data for the FIG. 24 character in the printing buffer after the base line position for that character is changed.

Since double-line printing is in effect, with the flag F1 found to be set in step S78, step S80 is reached in which a data revising process control routine (see FIGS. 17A–B) is executed. When this routine is started, the address b0005 in the second arrangement memory 33 and corresponding to the first pointer P1 is set to the second pointer P2 in step S150. In step S151, the code data for the character "D" pointed to by the first pointer P1 are read from pattern data memory (ROM 29). Step S152 stores the dot pattern data of the above code data into the location corresponding to the center line CL in the printing buffer 39, as illustrated in FIG. 24. Step S153 checks to determine whether a printing base line position change mount "d" is included in the upper line printing command data. If the result of step S153 is affirmative, step S154 is reached in which the base line position change mount "d" (+4 dots) is read out. Step S156 shifts the above dot pattern data in the dot column direction by the dot count obtained by adding the base line position change mount "d" to the "4 dots" for originally shifting the dot pattern data toward the normal printing base line position PS2 of the upper line, as depicted in FIG. 25. Since the mount "d" is 4 with the first embodiment, the character "D" in FIG. 25 is stored after being shifted 4 dots above the normal printing base line position PS2 of the upper line.

Figure 26:
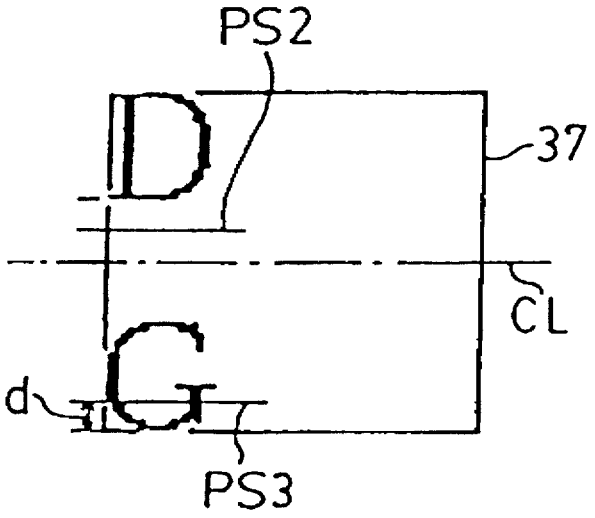
FIG. 26 is another view schematically depicting dot pattern data in the printing buffer of FIG. 25, and including character data to be printed in a lower line.

In step S157, the rode data for the character "G" pointed to by the second pointer P2 are read out. Step S158 stores the dot pattern data of the above code data into the lower position within the printing buffer 39, as shown in FIG. 26. Step S159 determines whether the lower line printing command data include the printing base line position change mount "d". If the result of step S159 is affirmative, step S160 is reached in which the base line position change mount "d" (–4 dots) is read. Step S160 is followed by step S162. Step S162 shifts the above dot pattern data in the dot column direction by the dot count obtained by adding the base line position change mount "d" to the "4 dots" for originally shifting the dot pattern data toward the normal printing base line position PS3 of the lower line. Then the data revising process control routine is terminated, and control is returned. If the results of the determination in steps S153 or S159 are negative, the printing base line position change mount "d" is set to 0 in steps S155 and S161. Because the mount "d" is –4 with the first embodiment, the character "G" in FIG. 26 is stored after being shifted 4 dots below the normal printing base line position PS of the lower line.

Thereafter, step S81 (FIG. 12A) performs character printing in accordance with the dot pattern data for the two characters revised and stored in the printing buffer 39 as shown in FIG. 26. Likewise, the data held in the fast and the second arrangement memories 32 and 33 as illustrated in FIG. 22 are printed under printing process control of steps S60 through S81. For a more detailed description of the process for printing the lower line directly below the upper line, see the above incorporated U.S. patent [application Ser. No. 07/831,971]*No. 5,302,038.*

Figure 27:
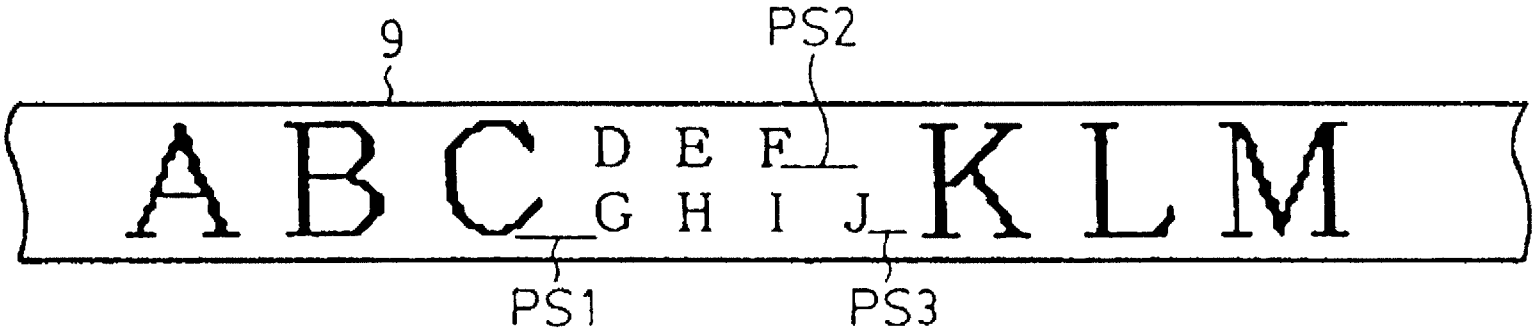
FIG. 27 is a view illustratively depicting single- and double-line character strings printed on a printing tape, the characters being printed without setting a defined printing length.
Figure 28:
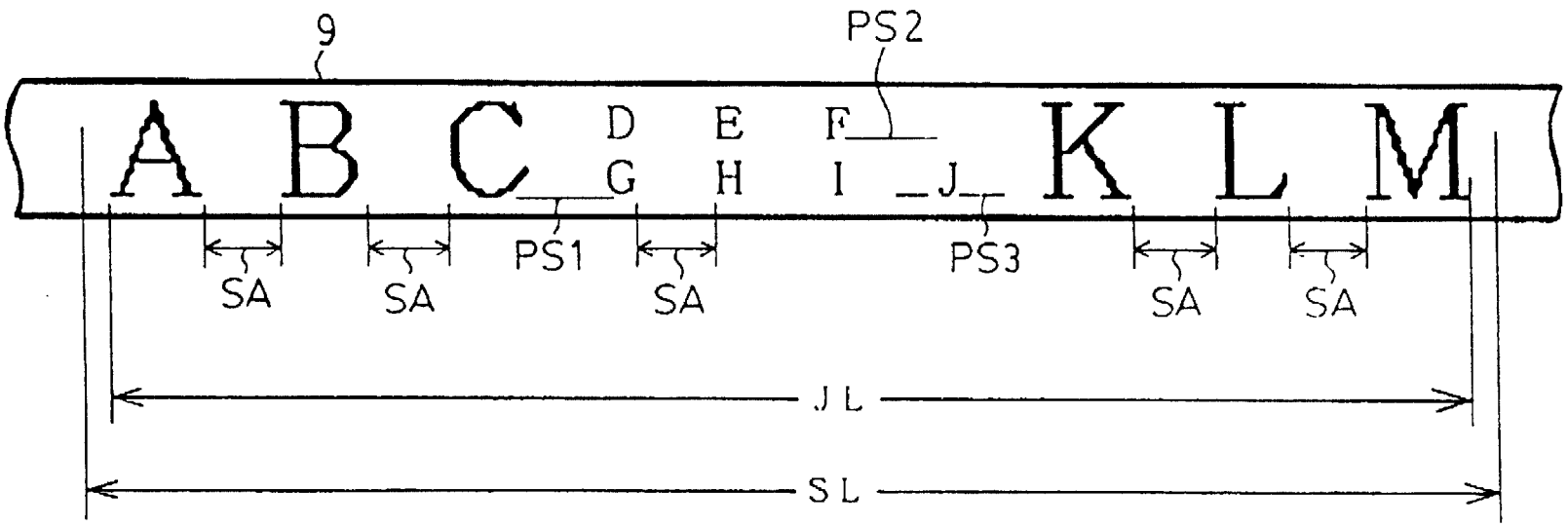
FIG. 28 is a view illustratively depicting single- and double-line character strings printed on a printing tape over a defined printing length, the characters being equally spaced.

Thus, for the unfixed length printing shown in FIG. 27, the character string "ABC" and "KLM" are printed over the printing range PE in a single line on the printing tape 9, while a character string "DEF" is printed in the upper printing line UL, and a character string "GHIJ" is printed in the lower printing line LL. The character strings "DEF" and "GHIJ," when printed, are shifted from their original printing positions in accordance with the designated printing base line change mount "d". For the fixed length printing depicted in FIG. 28, the printed characters are spaced from one another by the determined spacing value SA. This automatically expands the input character string up to the printing range of the actual printing length JL within the established printing length SL.

In this manner, the input character strings are appropriately balanced in terms of character spacing when printed over a desired printing length SL on the printing tape 9.

As a second embodiment of the invention, the tape printer 1 may be arranged to print, as with conventional English language typewriters, input characters having the pica or elite pitch over a fixed length. To provide such functions, the second embodiment may require the keyboard 4'to include printing pitch keys by which to designate the pica or elite pitch. At the same time, the pattern data memory 29 may have printing pitch tables containing the printing pitch settings for L size and SS size characters. Furthermore, the character spacing determining process control routine may have step S170 interposed between steps S114 and S116 in FIG. 14. In this case, the character spacing determining process control routine operates as depicted in FIG. 29.

Figure 29A:
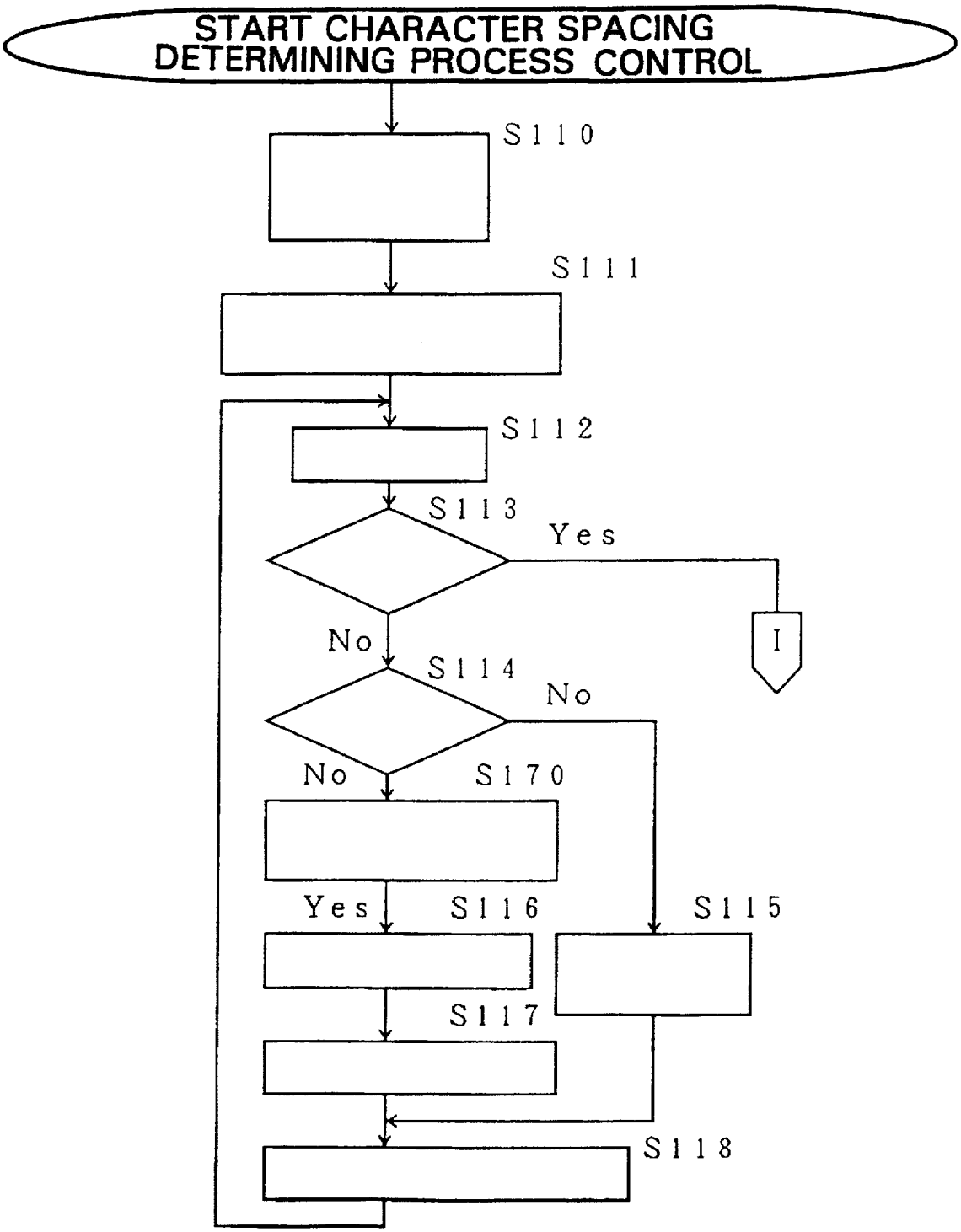

Referring to FIG. 29, if the read-out data are not code data, step S112 is followed by steps S113, S114 and S115, in that order. In step S115, a pitch table is selected in accordance with the read-out printing command data and in accordance with a signal from a printing pitch key operation. When the next read data are code data, step S112 is followed by [step] *steps* S113, S114 and S170, in that order. Step S170 sets the character width PW using the printing pitch data read from the selected pitch table. The rest of the process is the same as depicted in FIG. 14.

A proportional spacing function may also be implemented. This function involves adding optimum spacing to the printed characters for each different font. In that case, the pattern data memory 29 may contain as many pitch tables as the number of printing pitches desired, each table storing the character width data for each character in L and SS sizes. In operation, step S115 selects the pitch table that corresponds to the printing command data read out. Step S170 sets as the character width PW the character width data corresponding to the code data read from the selected pitch table.

As a variation of the described embodiment, the pattern data memory 29 may contain the dot pattern data about three or four character sizes, any of which may be selected for single- and double-line printing.

Another variation of the described embodiments is to supplement the printing buffer holding the dot string data for the current printing pass, by another printing buffer for accommodating the dot string data for the next printing pass. This enables the contents of the first printing buffer to be output and printed while the next characters are being input to the second printing buffer, thus increasing an operating speed of the tape printer.

As described, the code data for the characters stored in the input data buffer 31 are arranged in the first and the second arrangement memories 32 and 33 (in steps S90 through S104). The character spacing value for equally separating characters from one another is determined in accordance with the number of code data in the first arrangement memory 32 and with the data about the established printing length (in steps S110 through S129). During printing, the characters are automatically spaced according to the determined character spacing value. In this manner, the input characters are automatically expanded up to a desired printing range.

Although the description above contains many specificities, these should not be construed as limiting the scope of the invention but as merely providing illustrations of some of the presently preferred embodiments of this invention. For example, the invention may also be embodied as a tape printer that requires the printing tape 9 to be drawn out manually as characters are being printed thereon. Another alternative example is a wire dot type tape printer, or any of many other tape printers.

Additionally, the specific keys described for performing specific functions are merely illustrative; other key combinations, or other input means could also be used. Additionally, the specific symbols represented on the display could differ from what was described above.

Thus the scope of the invention should be determined by the appended claims and their legal equivalents, rather than by the examples given.

What is claimed is:

1. A tape printer for printing characters onto a print medium tape in accordance with input data comprising a continuous supply of print medium tape; input means for inputting character code data and command code data;

an input data buffer for storing the input code data;

a printing head for printing characters onto the print medium tape;

driving means for driving the printing head by successively receiving the code data from the input data buffer;, printing length setting means for [inputting one of a plurality of measurements of] *setting* a desired line length across which the input characters are to be printed onto the print medium tape;

character spacing determining means for receiving the code data from the input data buffer and line length measurement set by the printing length setting means, and for determining a character spacing value so that the input characters are evenly spaced across an entire printable length of the line length measurement; and spacing controlling means for receiving the character spacing value determined by the character spacing determining means and controlling the driving means in order to provide the determined character spacing value between characters when the characters are printed by the printing head.

2. A tape printer according to claim 1, said driving means including:

pattern data storing means for storing dot pattern data for a plurality of characters;

a printing buffer for receiving from said pattern data storing means the dot pattern data for characters corresponding to the input character code data from the input data buffer and for storing the received dot pattern data; and controlling means for controlling said printing head by successively receiving dot strings of data from said dot pattern data stored in said printing buffer.

3. A tape printer according to claim 2, wherein the printing length setting means sets a value of said line length measurement from a plurality of sequential values.

4. A tape printer according to claim 3, wherein line length measurement includes an unprintable length, located on an edge of the print medium tape, and said printable length, and a smallest value which can be set from said plurality of sequential values by said length setting means is a sam of a minimum printable length and said unprintable length.

5. The tape printer of claim 2, wherein said pattern data in said pattern data storing means includes regular size character data and double size character data; printing buffer receives and stores said double size character data as single line data, and said regular size data as upper line data and lower line data based upon a line designation command supplied from said input means; and wherein said character spacing determining means determines said character spacing value without receiving code data regarding one of said upper line data and lower line data.

6. The tape printer of claim 1, further comprising:

fixed length mode selecting means for selecting between a fixed length mode wherein said printing line length setting means is operative to set the length measurement, and a default length mode wherein a default value is used for said character spacing value.

7. The tape printer of claim 1, further comprising:

a display for displaying the code data input from said input means.

8. The tape printer of claim 7, wherein said display includes means for successively displaying a plurality of possible line length measurements in response to fixed length selection command code data input from said input means.

9. The tape printer according to claim 1, wherein said line length measurement includes an unprintable length located on an edge of the print medium tape, and said printable length, and a smallest value which can be set from said plurality of lengths by said length setting means is a sum of a minimum printable length and said unprintable length.

10. The tape printer of claim 9, wherein said character spacing determining means includes:

means for determining said printable length in which characters can be printed within the length set by said printing length setting means by subtracting said unprintable length from said set line length measurement;

means for determining a total number of characters to be printed;

means for determining a total character width required to print the total number of characters; and spacing value determining means for determining said character spacing value by evenly distributing a difference between said printable length and said total character width amongst inter-character spaces located between said total number of characters.

11. The tape printer of claim 10, wherein said means for determining a total character width includes pitch tables storing printing pitch data, the command code data includes selecting data for selecting one of the pitch tables, and said means for determining a total character width determines the total character width based on a printing pitch data of the pitch table selected by the selecting data.

12. The tape printer of claim 10, wherein said spacing value determining means increases said spacing value between some of the characters to be printed when the difference between the printable length and the total character width is not an integer multiple of the inter-character spaces.

13. The tape printer of claim 10, wherein said means for determining a total character width determines said total character width based upon a constant character width amount for each character.

14. The tape printer of claim 13, wherein said means for determining a total character width includes pitch tables storing printing pitch data, the command code data includes selecting data for selecting one of the pitch tables, and said means for determining a total character width determines the total character width based on a printing pitch data of the pitch table selected by the selecting data.

15. A tape printer for printing characters onto a print medium tape by driving a printing head with a printing driver, said printing driver causing the printing head to print dot strings from successive dot pattern data groups corresponding to operator selected desired characters, and to insert spaces in accordance with a character spacing value between each successive dot pattern data group, comprising:

a continuous supply of print medium tape;

input means for inputting character code data of the desired characters and command code data;

printing length setting means for [inputting one of a plurality of measurements of] *setting* a desired line length across which the desired characters are to be printed onto the print medium tape; and character spacing determining means for determining the character spacing value, based upon the input character code data and the line measurement set by said printing length setting means, so that the desired characters are evenly spaced across an entire printable length of said line length measurement.

16. The tape printer of claim 15, further comprising:

fixed length mode selecting means for selecting between a fixed length mode wherein said printing line length setting means is operative to set the length measurement, and a default length mode, wherein a default value is used for said character spacing value.

17. The tape printer of claim 15, further comprising:

a display for displaying the code data input from said input means.

18. The tape printer of claim 17, wherein said display includes means for successively displaying a plurality of possible line length measurements in response to fixed length selection command code data input from said input means.

19. The tape printer of claim 15, wherein said character spacing determining means includes:

means for determining the printable length in which characters can be printed within the length set by said printing length setting means by subtracting an unprintable length from said set line length measurement;

means for determining a total number of desired characters to be printed;

means for determining a total character width required to print the total number of desired characters; and spacing value determining means for determining said character spacing value by evenly distributing a difference between said printable length and said total character width amongst inter-character spaces located between said total number of characters.

20. The tape printer of claim 19, where said spacing value determining means increases said spacing value between some of the characters to be printed when the difference between the printable length and the total character width is not an integer multiple of the inter-character spaces.

21. The tape printer of claim 19, wherein said means for determining a total character width determines said total character width based upon a constant character width amount for each character.

22. The tape printer of claim 21, wherein said means for determining a total character width includes pitch tables storing printing pitch data, the command code data includes selecting data for selecting one of the pitch tables, and said means for determining a total character width determines the total character width based on a printing pitch data of the pitch table selected by the selecting data.

23. The tape printer of claim 19, wherein said means for determining a total character width includes pitch tables storing printing pitch data, the command code data includes selecting data for selecting one of the pitch tables, and said means for determining a total character width determines the total character width based on a printing pitch data of the pitch table selected by the selecting data.

24. A tape printer for printing characters onto a print medium tape in accordance with input data comprising:

a continuous supply of print medium tape;

input means for inputting character code data and command code data;

an input data buffer for storing the input code data;

a printing head for printing characters onto the print medium tape;

driving means for driving the printing head by successively receiving the code data from the input data buffer;

printing length setting means for inputting a measurement of a desired length across which the input characters are to be printed onto the print medium tape;

[character spacing determining means for receiving the code data from the input data buffer and line length measurement set by the printing length setting means and for determining a character spacing value so that input characters are evenly spaced within the line length measurement;]

spacing controlling means for [receiving the character spacing value determined by the character spacing determining means and controlling the driving means in order to provide the determined] *determining and providing a* character spacing value between characters *for use* when the characters are printed by the printing head; and comparing means for determining a total character width of the input characters based on a width of each of the input characters and for comparing the determined total character width and the line length measurement and for generating a error signal when the total character width is larger than the line length measurement.

25. A tape printer according to claim 24, further comprising:

warning means for providing a warning according to the error signal generated by said comparing means.

*26. The tape printer of claim 15, wherein the line length includes an unprintable length on at least one end of the print medium tape.*

*27. A tape printer for printing characters onto a print medium tape in accordance with input data, the printer comprising:*

*input means for inputting character code data of desired characters and command code data;*

*an input data buffer for storing the input code data;*

*a printing head for printing characters onto the print medium tape;*

*driving means for driving the printing head by successively receiving the code data from the input data buffer;*

*printing length setting means for setting a length of a printing range for printing characters desired to be printed onto the print medium tape;*

*means for determining a total number of the characters desired to be printed;*

*means for determining a total character width required to print the total number of desired characters;*

*means for comparing the length of the printing range with the total character width to determine if the length of the printing range is capable of accommodating the characters desired to be printed; and*

*means for outputting an error message if the length of the printing range is determined to be incapable of accommodating the characters desired to be printed.*

*28. The tape printer according to claim 27, wherein the length of the printing range includes an actual printable length, in which length the characters are printable, and at least one unprintable portion in which the characters are unprintable.*

*29. The tape printer according to claim 28, wherein said means for comparing compares the actual printable length with the total character width to determine if the actual printable length is capable of accommodating the characters desired to be printed and the means for outputting outputs the error message if the actual printing length is determined to be incapable of accommodating the characters desired to be printed.*

*30. The tape printer according to claim 28, wherein the length of the printing range includes an unprintable length located on at least one end of the print medium tape.*

*31. The tape printer according to claim 28, further comprising:*

*character spacing determining means for receiving the code data from the input data buffer and printing range length data set by the printing length setting means in order to determine a character spacing value so that input characters are evenly spaced when printed within the printing range; and*

*spacing controlling means for receiving the character spacing value output from the character spacing determining means and controlling the driving means in order to provide the output character spacing value between characters when the characters are printed by the driving means.*

*32. The tape printer according to claim 31, wherein said driving means includes:*

*pattern data storing means for storing dot pattern data for a plurality of characters, the dot pattern data in said pattern data storing means includes regular size character data and double size character data;*

*a printing buffer for receiving from said pattern data storing means the dot pattern data for characters corresponding to the input character code data from the input data buffer and for storing the received dot pattern data, said printing buffer receives and stores the double size character data as single line data, and the regular size data as upper line data and lower line data based upon a line designation command supplied from said input means; and*

*controlling means for controlling said printing head by successively receiving dot strings of data from said dot pattern data stored in said printing buffer, wherein said character spacing determining means determines the character spacing value without receiving code data regarding one of the upper line data and the lower line data.*

*33. The tape printer according to claim 31, further comprising:*

*fixed length mode selecting means for selecting between a fixed length mode wherein said printing length setting means is operative to set the length of the printing range, and a default length mode wherein a default value is used for said character spacing value.*

*34. The tape printer according to claim 27, wherein said means for determining a total character width determines the total character width based on a constant character width amount for each character.*

*35. The tape printer according to claim 27, further comprising display means for displaying the error message.*

*36. The tape printer according to claim 34, wherein said means for determining a total character width includes pitch tables storing printing pitch data, the command code data includes selecting data for selecting one of the pitch tables, and said means for determining a total character width determines the total character width based on printing pitch data of the pitch table selected by the selecting data.*

*37. A tape printer for printing characters onto a tape in accordance with input data, comprising:*

*a printing head;.*

*input means for inputting character code data and command code data;.*

*an input data buffer for storing the input code data;*

*driving means for driving the printing head successively receiving the input code data from said input data buffer;*

*printing length setting means for setting a length of a printing range to print characters being input by character code data onto the tape; and*

*determining means for determining whether a sum of the width of the characters to be printed is greater than the length of the printing range.*

*38. The tape printer according to claim 37, wherein the length of the printing range includes an unprintable length located on at least one end of the tape in which the characters are not able to be printed and a printable length in which the characters are able to be printed.*

*39. The tape printer according to claim 37, further comprising error message indicating means adapted to indicate an error message if said determining means determines that the sum of the width of the characters to be printed is greater than the length of the printing range.*

*40. The tape printer according to claim 39, wherein said error message indicating means is a display means.*

*41. The tape printer according to claim 37, said driving command including:*

*pattern data storing means for storing dot pattern data for a plurality of characters;*

*a printing buffer for receiving from said pattern data storing means the dot pattern data for characters corresponding to the input character code data from the input data buffer and for storing the received dot pattern data; and*

*controlling means for controlling said printing head by successively receiving dot strings of data from the dot pattern data stored in said printing buffer.*

*42. The tape printer according to claim 41, wherein the pattern data in said pattern data storing means includes regular size character data and double size character data, said printing buffer receives and stores the double size character data as single line data and the regular size data as upper line data and lower line data based upon a line*

*designation command supplied from said input means, and wherein said character spacing determining means determines the character spacing value without receiving code data regarding one of the upper line data and the lower line data.*

*43. The tape printer according to claim 37, further comprising:*

*fixed length mode selecting means for selecting between a fixed length mode wherein said printing length setting means is operative to set the length of the printing range and a default length mode wherein a default value is used for the character spacing value.*

*44. The tape printer according to claim 39, wherein said determining means includes:*

*means for determining an actual printable length within the length set by Said printing length setting means in which characters can be printed;*

*means for determining a total number of desired characters to be printed; and*

*means for determining a total character width required to print the total number of desired characters.*

*45. The tape printer according to claim 44, further comprising:*

*spacing value determining means for determining the character spacing value by evenly distributing a difference between the actual printable length and the total character width amongst inter-character spaces located between the total number of characters; and*

*means for determining whether the total character width of the desired characters tape printed is greater than the actual printable length.*

*46. A method for printing characters onto a tape, comprising the steps of:*

*inputting character and command code data;*

*storing the input character and command code data;*

*establishing a length for the printed tape;*

*determining whether the input character data can be printed within the established length of the printed tape; and*

*indicating an error if the input character data cannot be printed within the established length of the printed tape.*

*47. The method according to claim 46, further comprising the steps of:*

*storing dot pattern data for a plurality of characters; and converting the input character data to dot pattern data for printing.*

*48. The method according to claim 46, wherein the step of establishing a length comprises a one of a step of selecting a length for the printed tape and a step of determining a printed tape length based upon the dot pattern data of the input character data and default spacing data.*

*49. The method according to claim 46, wherein the step of determining whether the input character data can be printed includes a step of determining an actual printable length based upon a total number of desired characters to be printed, a total character width required to print the total number of characters to be printed, and a character spacing value for inter-character spaces between the characters to be printed.*

*50. The method according to claim 46, wherein the established length of the printed tape includes an unprintable length located on at least one end of the printed tape in which the characters are not able to be printed and a printable length in which the characters are able to be printed.*

*51. The method according to claim 46, wherein said step of determining whether the input character data can be printed further includes the steps of:*

*determining a total character width required to print the total number of characters to be printed; and*

*comparing the total character width with the established length.*

*52. The method according to claim 46, wherein said step of determining whether the input character data can be printed further includes the steps of:*

*determining a total character width required to print the total number of characters to be printed; and*

*comparing the total character width with an actual printable length of the tape.*

*53. A tape printer for printing characters onto a tape in accordance with input data, comprising:*

*a printing head;*

*input means for inputting character data and command code data;*

*first printing length setting means for setting a desired length of a printing range for printing characters desired to be printed onto the tape;*

*second printing length setting means for setting a length of a printing range for printing characters based on a total width of the input characters including a default character spacing value; and*

*mode setting means for selectively setting one of a fixed length mode wherein the first printing length setting means is operative to set the desired length of the printing range and a default length mode wherein the second printing length setting means is operative to set a length of the printing range.*

*54. The tape printer according to claim 53, wherein the printing range includes an unprintable length located on at least one end of the tape in which the characters are not able to be printed and a printable length in which the characters are able to be printed.*

* * * * *